United States Patent
Raz et al.

(10) Patent No.: US 12,461,752 B1
(45) Date of Patent: Nov. 4, 2025

(54) REUSING THREAD IDENTIFICATION VALUES WHEN EXECUTING CONCURRENT THREADS

(71) Applicant: Next Silicon Ltd, Givatayim (IL)

(72) Inventors: Elad Raz, Ramat Gan (IL); Ilan Tayari, Tzur Hadassa (IL); Ronen Gal, Ramat Gan (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 19/214,099

(22) Filed: May 21, 2025

(51) Int. Cl.
  *G06F 9/50* (2006.01)
  *G06F 9/38* (2018.01)
(52) U.S. Cl.
  CPC .......... *G06F 9/3889* (2013.01); *G06F 9/5072* (2013.01)
(58) Field of Classification Search
  CPC .............................. G06F 9/3889; G06F 9/5072
  See application file for complete search history.

(56) References Cited

U.S. PATENT DOCUMENTS 11,875,153 B1 * 1/2024 Raz ..................... G06F 9/30123

* cited by examiner

*Primary Examiner* — Sisley N Kim

(57) ABSTRACT

A system for executing multiple concurrent threads, comprising: context storages, each configured to store thread contexts, each context for one of the multiple threads, each of the context storages associated with an operation of the threads; and processing circuitry configured to: while a first and a second thread are executed simultaneously by the circuitry: store a first context of the first thread in a first storage, identified in the first storage by a value; store a second context of the second thread in a second storage, identified in the second storage by the value; and upon completing execution of a first operation of the first thread, the operation associated with the first storage, when applying a test to the value indicates that the value is available in the second storage, store the first context in the second storage, the first context identified in the second storage by the value.

20 Claims, 20 Drawing Sheets

REUSING THREAD IDENTIFICATION VALUES WHEN EXECUTING CONCURRENT THREADS

BACKGROUND

Some embodiments described in the present disclosure relate to concurrent execution in a computerized system and, more specifically, but not exclusively, to executing one or more dataflow graphs using a plurality of concurrent threads of execution.

As used herewithin, the term reconfigurable processing grid refers to processing circuitry comprising a plurality of reconfigurable logical elements connected by a plurality of reconfigurable data routing junctions where the plurality of reconfigurable logical elements and additionally or alternatively the plurality of reconfigurable data routing junctions may be manipulated, in each of one or more iterations, to execute one or more operations. As used herewithin, the term dataflow means a computer-programming paradigm that models at least part of a software program as a directed graph of data (a dataflow graph) flowing between operations such that a series of operations is applied to each data element in a sequence of data elements of the dataflow graph. Optionally, a dataflow graph comprises a plurality of nodes, each applying an operation to a data element, and a plurality of directed edges, each connecting two of the plurality of nodes and indicative of a flow of data between the two nodes.

In the field of computer science, a thread of execution is a sequence of computer instructions that can be managed independently, for example by a scheduler. For brevity, the term "thread" is used to mean "a thread of execution" and the terms are used interchangeably herewithin. A thread may implement a dataflow graph. In data flow architectures, threads progress through a computation pipeline comprising multiple computation elements. As used herein, the term "computation element" refers to a hardware component configured to perform one or more operations on data in a thread. Some examples of computation elements include arithmetic logic units, floating-point units, memory access units, and control flow units. As used herewithin, the term "projection" refers to a process of manipulating one or more reconfigurable logical elements of a reconfigurable processing grid, and additionally or alternatively manipulating one or more reconfigurable data routing junctions of the reconfigurable processing grid, to execute a dataflow graph. Thus, projecting a thread implementing a dataflow graph onto a reconfigurable processing grid refers to configuring the reconfigurable processing grid by manipulating one or more reconfigurable logical elements of the reconfigurable processing grid, and additionally or alternatively manipulating one or more reconfigurable data routing junctions of the reconfigurable processing grid, to execute the dataflow graph that is implemented by the thread.

In the field of computer science, concurrent computing refers to executing multiple threads of execution of a software program simultaneously. Executing multiple threads of a software program simultaneously allows increasing the overall performance and responsiveness of a system. Metrics used to measure a system's performance include, but are not limited to, a number of tasks executed by the system in an identified amount of time (throughput), an amount of time to complete execution of a task (latency) and an amount of computer memory used by the system when operating. Concurrent computing may be used to increase throughput and reduce latency of a system.

It may be that each of a plurality of concurrent threads comprises one or more identified operations. When executing a plurality of concurrent threads simultaneously on a reconfigurable processing grid, each concurrent thread of the plurality of concurrent threads is projected onto part of the reconfigurable processing grid, i.e., some of a plurality of logical elements of the reconfigurable processing grid are manipulated to execute the concurrent thread, for example to execute a dataflow graph implemented by the concurrent thread.

There exist computer instructions whose latency for completion is inconsistent and unpredictable. Such an operation may require a different amount of time to execute when executed more than once, and additionally or alternatively may require more time to complete than other instructions. Some examples of such inconsistent latency operations include, but are not limited to, memory access, access to a peripheral device and executing a compute kernel.

SUMMARY

Some embodiments described in the present disclosure relate to concurrent execution in a computerized system and, more specifically, but not exclusively, to executing one or more dataflow graphs using a plurality of concurrent threads of execution.

When a thread executing a pipeline of operations encounters an operation with inconsistent execution times the thread may be suspended, requiring the thread's context to be stored. When the thread's context is stored in a context storage configured to store more than one thread context, the thread's context is identified by an identifier associated with the thread. Some existing solutions require using unique identifiers to identify a thread's context throughout the pipeline of operations. It is an object of some embodiments described in the present disclosure to provide a system and a method for executing concurrent threads by a plurality of processing circuitries with out-of-order execution capabilities while optimizing the use of context storage resources. In such embodiments, multiple concurrent threads of a plurality of concurrent threads share the same identifier at different points in a pipeline of operations executed by the plurality of processing circuitries.

Reusing an identifier at different stages of the pipeline allows reducing the amount of storage required to store thread contexts for the plurality of concurrent threads executing concurrently in the pipeline compared to requiring each thread to have a unique identifier, requiring each context storage at each point of the pipeline to support storage of a thread with any of the unique identifiers. Looking at the problem from another direction, the suggested solution allows increasing the number of threads that can execute concurrently in the pipeline beyond another number of threads that each context storage can store at once.

The foregoing and other objects are achieved by the features of the independent claims. Further implementation forms are apparent from the dependent claims, the description and the figures.

According to a first aspect, a system for executing a plurality of concurrent threads, comprises a plurality of context storages, each configured to store a plurality of thread contexts, each thread context for one of a plurality of concurrent threads, each concurrent thread comprising a plurality of operations, each of the plurality of context storages associated with at least one operation of the plurality of operations; and at least one processing circuitry configured to: while a first thread and a second thread of the plurality of concurrent threads are executed simultaneously by the at least one processing circuitry: store a first thread context of the first thread in a first context storage of the plurality of context storages, the first thread context identified in the first context storage by an identification value; store a second thread context of the second thread in a second context storage of the plurality of context storages, the second thread context identified in the second context storage by the identification value; and upon completing execution of at least one first operation of the first thread, the at least one first operation associated with the first context storage, when an outcome of applying an availability test to the identification value indicates that the identification value is available in the second context storage, store the first thread context in the second context storage, the first thread context identified in the second context storage by the identification value. Releasing a thread's identifier in its current storage when the thread completes operation at a particular stage and moves forward makes that identifier available for another thread. This availability mechanism ensures that while identifiers can be reused across different stages, no conflicts occur within any single stage.

According to a second aspect, a method for executing a plurality of concurrent threads, comprises: while a first thread and a second thread of a plurality of concurrent threads are executed simultaneously by at least one processing circuitry: storing, by the at least one processing circuitry, a first thread context of the first thread in a first context storage of a plurality of context storages, the first thread context identified in the first context storage by an identification value, where each of the plurality of context storages is configured to store a plurality of thread contexts, each thread context for one of the plurality of concurrent threads, each concurrent thread comprising a plurality of operations, each of the plurality of context storages associated with at least one operation of the plurality of operations; storing, by the at least one processing circuitry, a second thread context of the second thread in a second context storage of the plurality of context storages, the second thread context identified in the second context storage by the identification value; and upon completing execution of at least one first operation of the first thread, the at least one first operation associated with the first context storage, when an outcome of applying a credit test to the identification value indicates that the identification value is available in the second context storage, storing, by the at least one processing circuitry, the first thread context in the second context storage, the first thread context identified in the second context storage by the identification value.

According to a third aspect, a software program product for executing a plurality of concurrent threads, comprises: a non-transitory computer readable storage medium; program instructions for: while a first thread and a second thread of a plurality of concurrent threads are executed simultaneously by at least one processing circuitry: storing, by the at least one processing circuitry, a first thread context of the first thread in a first context storage of a plurality of context storages, the first thread context identified in the first context storage by an identification value, where each of the plurality of context storages is configured to store a plurality of thread contexts, each thread context for one of the plurality of concurrent threads, each concurrent thread comprising a plurality of operations, each of the plurality of context storages associated with at least one operation of the plurality of operations; storing, by the at least one processing circuitry, a second thread context of the second thread in a second context storage of the plurality of context storages, the second thread context identified in the second context storage by the identification value; and upon completing execution of at least one first operation of the first thread, the at least one first operation associated with the first context storage, when an outcome of applying a credit test to the identification value indicates that the identification value is available in the second context storage, storing, by the at least one processing circuitry, the first thread context in the second context storage, the first thread context identified in the second context storage by the identification value; wherein the program instructions are executed by at least one computerized processor from the non-transitory computer readable storage medium.

With reference to the first and second aspects, in a first possible implementation of the first and second aspects after storing the second thread context in the second context storage and before completing execution of at least one second operation of the second thread, where the at least one second operation is associated with the second context storage, the outcome of applying the availability test to the identification value indicates that the identification value is not available in the second context storage. Optionally, the at least one processing circuitry is further configured to: while the outcome of applying the availability test to the identification value indicates that the identification value is not available in the second context storage, continue to store the first thread context in the first context storage. Enabling the context of the first thread to wait in the first context storage until its identifier becomes available in the second context storage, maintains execution state while waiting. Optionally, the at least one processing circuitry is further configured to remove the first thread context from the first context storage. Optionally, after storing the first thread context in the first context storage and before removing the first thread context from the first context storage, another outcome of applying another availability test to the identification value indicates that the identification value is not available in the first context storage. Indicating that the identification value is not available in the first context storage prevents other threads from using the same identifier in the first context storage while the first thread's context is still there, maintaining identifier integrity within a single storage. Optionally, the at least one processing circuitry is further configured to, after storing the first thread context in the second context storage: cease to identify the first thread context in the first context storage by the identification value; and when applying another availability test to the identification value, compute another outcome that indicates that the identification value is available in the first context storage. Optionally, each of the plurality of context storages comprises a plurality of context entries, each for storing a plurality of runtime context values of one of the plurality of thread contexts. Optionally, the at least one operation comprises at least one of: a memory access operation, a mathematical operation, executing another computation-graph, an access to a co-processor, and an access to a peripheral device connected to the at least one processing circuitry.

With reference to the first and second aspects, in a second possible implementation of the first and second aspects the first thread context comprises a plurality of context values; and execution of at least one first operation of the first thread comprises modifying at least one other of the plurality of context values stored in the first context storage. Modifying one or more of the plurality of context values when storing a thread context in a context storage, while executing an operation of the thread, tracks execution progress of the thread. Optionally, storing the first thread context in the second context storage comprises modifying at least one of the plurality of context values. Modifying one or more of the plurality of context values when storing the thread context in the next context storage, after the thread completes execution of the operation, enables the thread context to be updated with new values when moving between context storages, reflecting progression of the thread's execution state.

With reference to the first and second aspects, in a third possible implementation of the first and second aspects the plurality of context storages comprises a sequence of context storages comprising the first context storage and an exit context storage, the first context storage has no preceding context storage in the sequence of context storages, the exit context storage has no succeeding context storage in the sequence of context storages, and the at least one processing circuitry is further configured to: before storing the first thread context in the first context storage, store an association between the identification value and the first thread; and after completing execution of the respective at least one operation of the first thread associated with the exit context storage, remove the association between the identification value and the first thread. Optionally, the at least one processing circuitry is further configured to: when a third thread of the plurality of concurrent threads is executed by the at least one processing circuitry simultaneously to executing the first thread and the second thread, store the third thread context in the first context storage where: when another outcome of applying another availability test to the identification value indicates that the identification value is available in the first context storage, the third thread context is identified in the first context storage by the identification value; and when the other outcome of applying the other availability test to the identification value indicates that the identification value is not available in the first context storage, the third thread context is identified in the first context storage by another identification value. Optionally, the at least one processing circuitry is further configured to: after completing execution of the respective at least one operation of the first thread associated with the exit context storage: store a new association between a new identification value and the first thread; and store a new first thread context of the first thread in the first context storage, the new first thread context identified in the first context storage by the new identification value. Optionally, the new first thread context comprises at least some context values from the first thread context. Maintaining some execution state when a thread loops back through the pipeline preserves necessary context between iterations. Assigning a thread a new identifier when looping back through the pipeline increases flexibility in assigning identifiers to threads, increasing utilization of the identifiers, thus increasing utilization of the pipeline.

With reference to the first and second aspects, in a fourth possible implementation of the first and second aspects, each concurrent thread of the plurality of concurrent threads implements a common dataflow graph, where the common dataflow graph comprises the plurality of operations. Implementing a common dataflow graph allows reusing circuitry for operations common among the threads, for example in a reconfigurable circuitry.

With reference to the first and second aspects, in a fifth possible implementation of the first and second aspects the at least one processing circuitry comprises at least one reconfigurable processing grid and the at least one hardware processor is configured to configure the at least one processing grid to execute at least one step that the at least one processing circuitry is configured to perform. Optionally, the at least one reconfigurable processing grid comprises the plurality of context storages. Optionally, the at least one reconfigurable processing grid comprises a plurality of logical elements and the at least one hardware processor is further configured to configure at least some of the plurality of logical elements to implement the respective at least one operation associated with the first context storage.

With reference to the first and second aspects, in a sixth possible implementation of the first and second aspects the at least one processing circuitry comprises testing circuitry for applying the availability test to the identification value. Optionally, the at least one processing circuitry is further configured to: after completing execution of at least one second operation of the second thread: remove the second thread context from the second context storage; and provide the testing circuitry with at least one token value indicating that the identification value is available in the second context storage. Implementing a token-based mechanism for signaling identifier availability between components enables efficient availability tracking, increasing accuracy of identifier use and maintaining integrity of the context storages.

With reference to the first and second aspects, in a seventh possible implementation of the first and second aspects the at least one processing circuitry is further configured to: before storing the first thread context in the first context storage, store in the first context storage a fourth thread context of a fourth thread of the plurality of concurrent threads, the fourth thread context identified in the first context storage by yet another identification value; complete execution of the respective at least one operation associated with the first context storage for the fourth thread before completing execution of the at least one first operation; and store the first thread context in the second context storage while an outcome of applying the availability test to the yet another identification value indicates that the yet another identification value is not available in the second context storage. Out-of-order execution, where a newer thread can progress past an older thread that is blocked, improves overall throughput.

With reference to the first and second aspects, in an eighth possible implementation of the first and second aspects the first context storage has a capacity to store an identified amount of thread contexts; and a total number of concurrent threads in the plurality of concurrent threads executed simultaneously by the at least one processing circuitry exceeds the identified amount of thread contexts. Executing simultaneously by the at least one processing circuitry a total number of concurrent threads that exceeds the capacity of a single context storage increases total throughput and reduces total latency of the plurality of concurrent threads.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

In the drawings:

FIGS. 1A, 1B and 1C are schematic block diagrams of an exemplary processing framework, as known in the art;

FIGS. 2A, 2B, 2C, 2D, and 2E are schematic block diagrams of another exemplary processing framework, as known in the art;

DETAILED DESCRIPTION

A challenge in managing parallel threads in a computation pipeline arises when threads encounter operations with inconsistent execution times. For example, memory access operations may take varying amounts of time depending on cache hits or misses. When a thread encounters such an operation, it may be suspended to allow other threads to utilize the computation resources. This requires storing the thread's context until it can resume execution.

In the field of computer programming, the term "context" refers to a state that exists when executing an operation. With regards to a thread, a thread's context is a set of values accessible by the thread when executing an operation. When the thread is executed by a central processing unit (CPU), the thread's context includes, among other values, a plurality of values of a plurality of registers of the CPU, one or more values of a Thread Local Storage (TLS), a plurality of values of a stack memory and a program counter value. As used herein, the term "thread context" refers to the information needed to resume execution of a suspended thread. Some examples of thread context include register values, program counter, and thread state information.

In the following description, various approaches to thread context management will be illustrated using frameworks with some common elements. Each example will show a plurality of concurrent threads executing a plurality of operations organized in a processing pipeline. The plurality of operations are executed sequentially within each concurrent thread, where a thread first executes a first operation, then a second operation, and so on.

While the specific implementation and flow of operations differs between the various approaches (as will be shown in the following figures), the fundamental challenge remains the same: how to efficiently manage thread execution and context storage when threads encounter operations with inconsistent execution times. Similar reference numbers were used to indicate the threads and operations among the figures.

It should be noted that for simplicity, each of the plurality of operations depicted in the following examples may each be a group of operations, and each may be organized in a sub-pipeline of the original pipeline. However, to simplify the explanations, the present disclosure refers to each in the singular. In addition, an operation may be a No Operation (NOP), for example when serving as a delay buffer.

Traditional approaches to thread context management have significant limitations. One approach uses first-in-first-out (FIFO) queues at each computation element. While efficiently using memory resources, this approach forces threads to execute in-order, limiting performance when threads encounter high-latency operations.

Figure 1A:
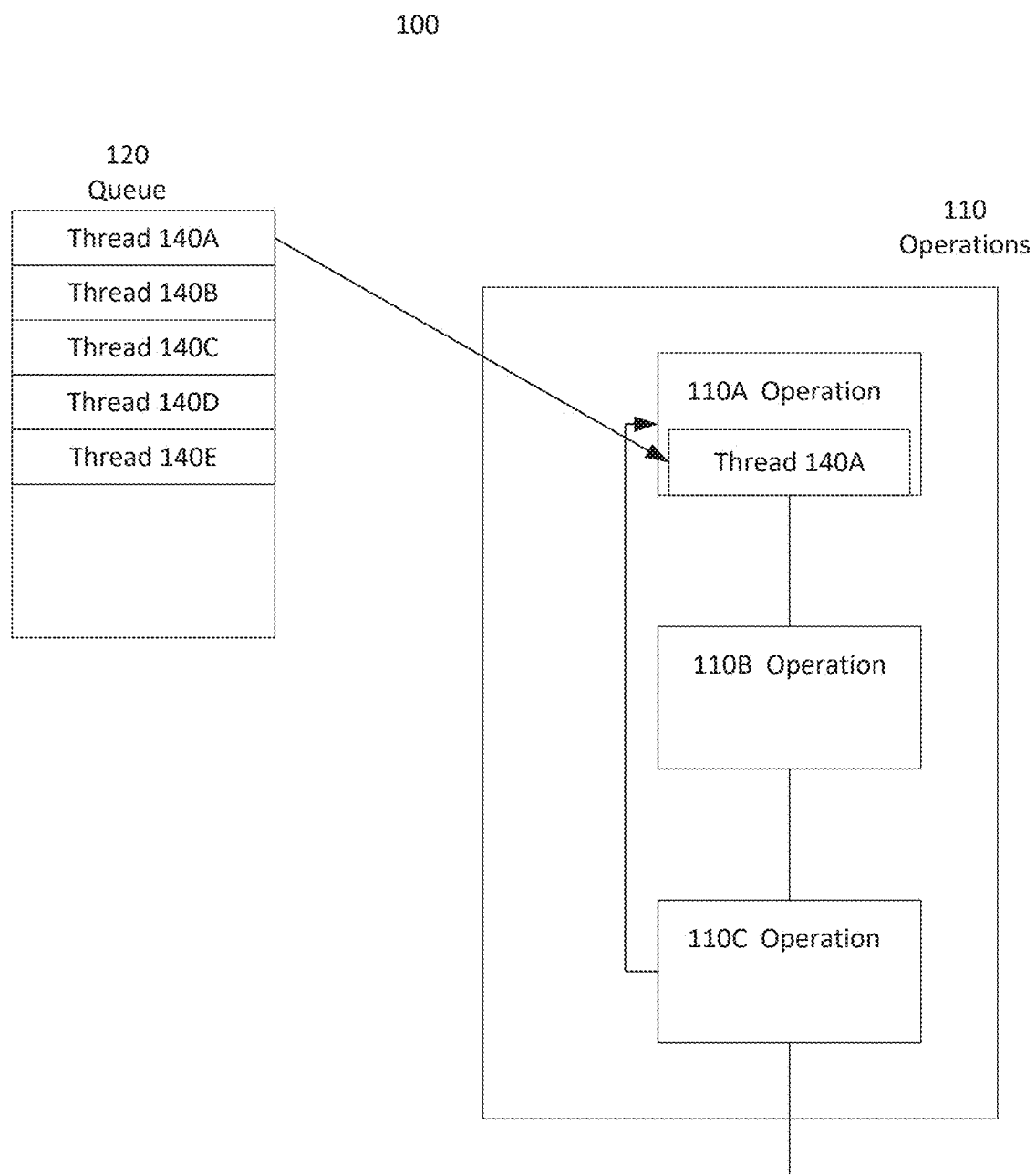
Figure 1B:
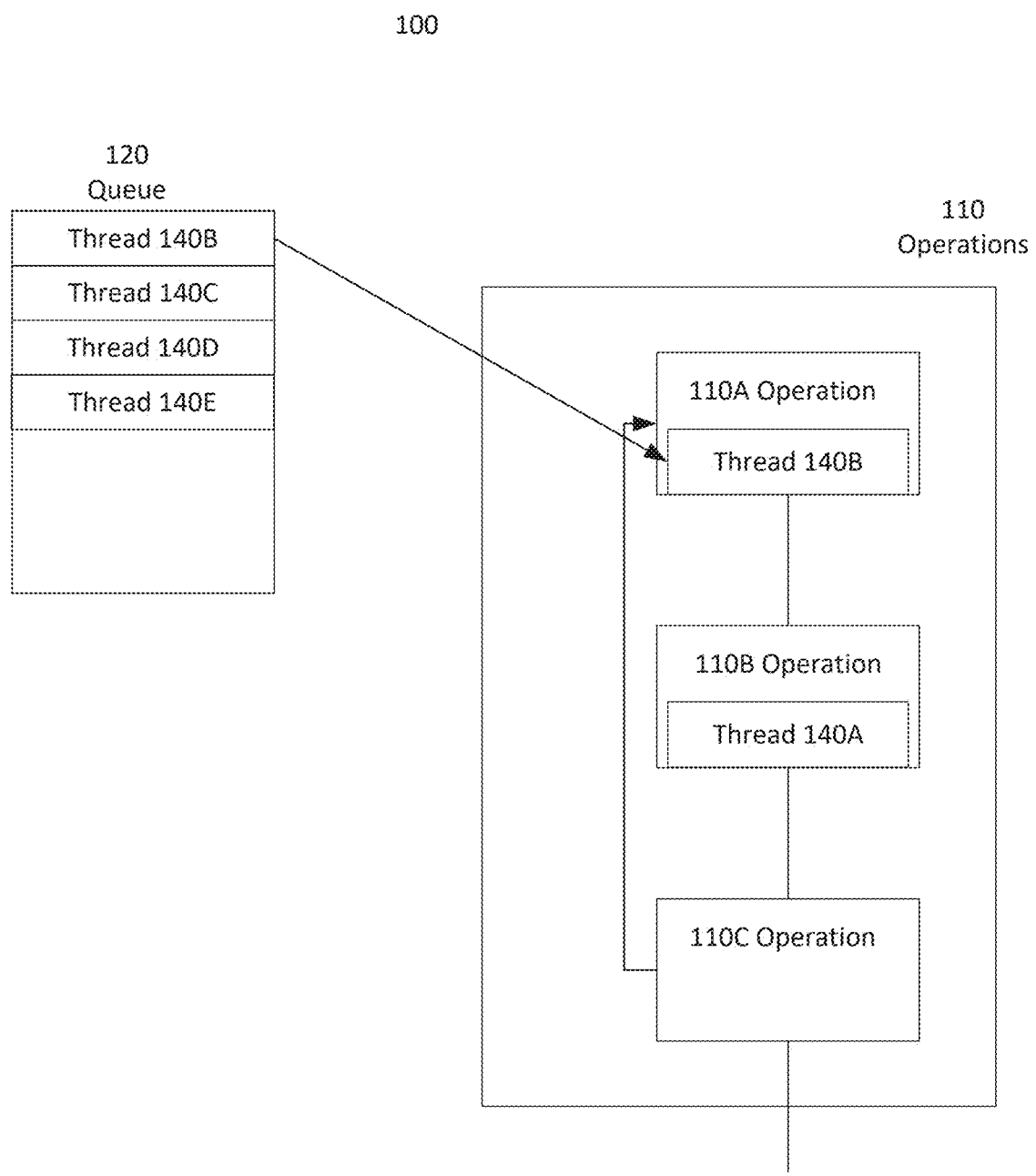

Reference is now made to FIGS. 1A, 1B and IC showing schematic block diagrams of an exemplary processing framework 100 that uses a FIFO approach. Referencing FIG. 1A, in this example a plurality of concurrent threads includes thread 140A, thread 140B, thread 140C, thread 140D and thread 140E, referred to collectively as plurality of concurrent threads 140. Optionally, the plurality of threads are organized in queue 120. Optionally, each of the plurality of concurrent threads 140 comprises a plurality of operations 110, optionally, comprising operation 110A, operation 110B and operation 110C. Optionally, plurality of operations 110 are organized in a pipeline where a thread executes operation 110A, then executes operation 110B and then operation 110C.

Figure 1C:
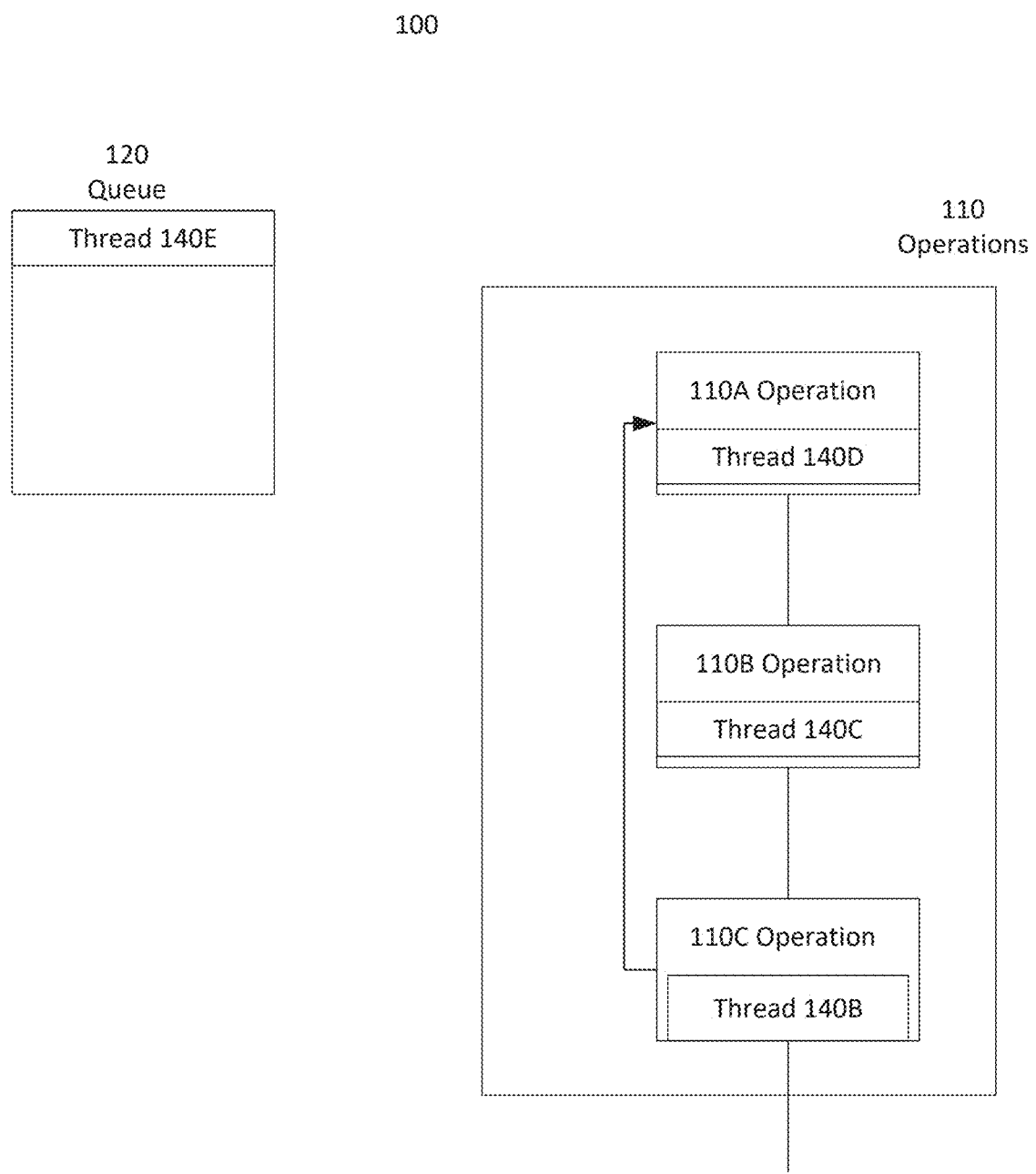

For example, thread 140A may start to execute pipeline 110, for example executing operation 110A. Referencing also FIG. 1B, when thread 140A completes execution of operation 110A thread 140A may move to execute operation 110B, allowing thread 140B to now execute operation 110A. As long as thread 140A has not completed executing operation 110B, thread 140B cannot move on from operation 110A to operation 110B and thread 140C cannot start executing. Referencing also FIG. 1C, only after thread 140A completes executing pipeline 110 thread 140D can start executing operation 110A. When a thread executes pipeline 110 in a loop (for example after operation 110C returning to operation 110A), the thread must join queue 120 again and wait until the threads before it in the queue complete executing pipeline 110. This mechanism forces the plurality of threads 140 to execute in a strict order. As a result, when one thread encounters latency, all other threads following it suffer that latency. For example, when thread 140A encounters latency in executing operation 110A, thread 140B is delayed by that latency, unable to start execution of operation 110A until thread 140A completes executing that operation.

It should be noted that for simplicity, operation 110A, operation 110B, and operation 110C may each be a group of operations, and each may be organized in a sub-pipeline of pipeline 110. However, to simplify the explanations, the present disclosure refers to each in the singular. In addition, an operation may be a No Operation (NOP), for example when serving as a delay buffer.

Another approach assigns each of the plurality of concurrent threads 140 an identifier that is unique throughout the pipeline 110, and allows out-of-order execution by using context storage to store a context of a thread executing an operation that has not completed and reuse resources that were used to execute the operation to execute an operation of another thread.

As used herein, the term "context storage" refers to a component configured to store thread contexts for threads being processed by a computation element. A context storage may be implemented in hardware, software, or a combination thereof. The following description focuses on context storage implemented mostly in hardware, but is not limited to such solutions. In addition, unless otherwise noted, for brevity herewithin the term "context" is used to mean "thread context" and the terms are used interchangeably. A runtime context value of a thread is a value accessible to the thread while the thread is executing. Optionally, a thread context comprises a set of runtime context values, and the term "thread context" as used herein refers to information needed to resume execution of a suspended thread, including, but not limited to, register values, program counter, thread state information, and other thread-specific data.

There exist solutions where each of the plurality of operations 110 is associated with one of a plurality of context storages. Each context storage is configured to store a plurality of thread contexts, where each thread context corresponds to one of the plurality of concurrent threads 140, and a thread context of a thread is stored in a context storage for each thread executing the operation associated with the context storage while the operation has not completed for the thread. In each context storage, the context of a thread is identified by the unique identifier assigned to the thread. One such solution is described in U.S. Pat. No. 11,875,153 issued 16 Jan. 2024 (Raz et al.).

Reference is now made also to FIGS. 2A, 2B, 2C, 2D, and 2E, showing schematic block diagrams of another exemplary processing framework 200, using thread identification values to allow out of order thread execution. Referencing also FIG. 2A, there exist solutions where each of the plurality of operations 110 is associated with one of a plurality of context storages comprising context storage 420A, context storage 420B and context storage 420C (referred to collectively as plurality of context storages 420). In this example, operation 110A is associated with context storage 420A, operation 110B is associated with context storage 420B and operation 110C is associated with context storage 420C. Optionally, a context storage of plurality of context storages 420 is used to store a thread context of each of the plurality of concurrent threads 140 while waiting for completion of execution of the one or more operations associated with the context storage, for the thread. For example, context storage 420A is configured to store one or more thread contexts of one or more of the plurality of concurrent threads 140 while waiting for completion of executing operation 110A for said one or more threads. Similarly, in this example context storage 420B is configured to store one or more thread contexts of threads waiting completion of execution of operation 110B and context storage 420C is configured to store one or more thread contexts of threads waiting completion of execution of operation 110C.

For brevity, henceforth the term ID is used to mean "thread identification value", thus ID 1 is "thread identification value 1", "ID 2" is "thread identification value 2" etc. In this solution, when starting execution of pipeline 110, thread 140A is assigned identifier ID 1. In addition, for simplicity operation 110A, operation 110B and operation 110C are each referred to in the singular but may comprise more than one operation of the plurality of operations 110. Referencing also FIG. 2B, while waiting for completion of execution of operation 110A for thread 140D, a context of thread 140A is stored in context storage 420A, associated with operation 110A. In context storage 420A the context of thread 140A is identified by ID 1, associated with thread 140A. Meanwhile, thread 140B may execute operation 110A, with thread 140B being assigned the identifier ID 2.

Figure 2A:
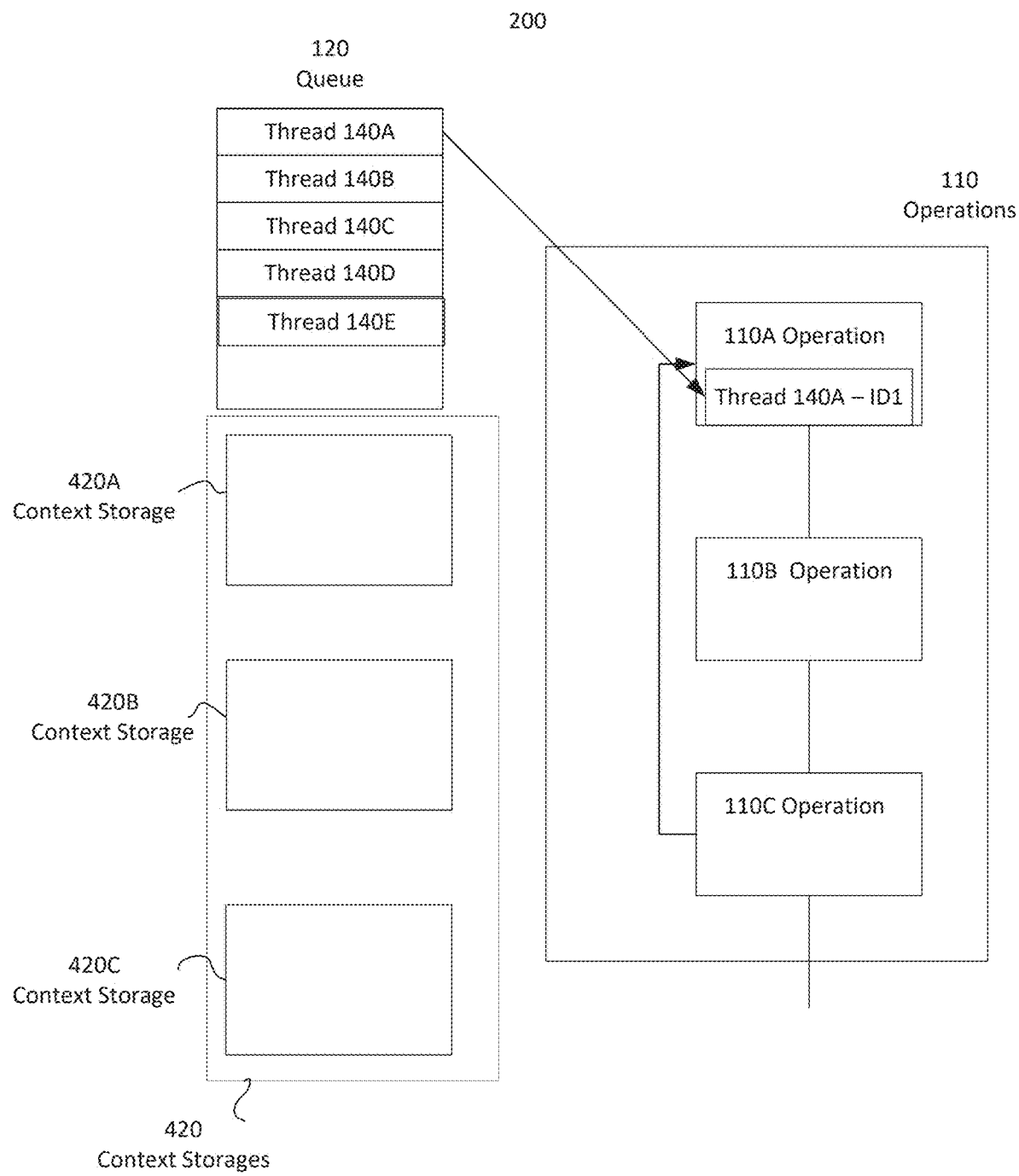
Figure 2B:
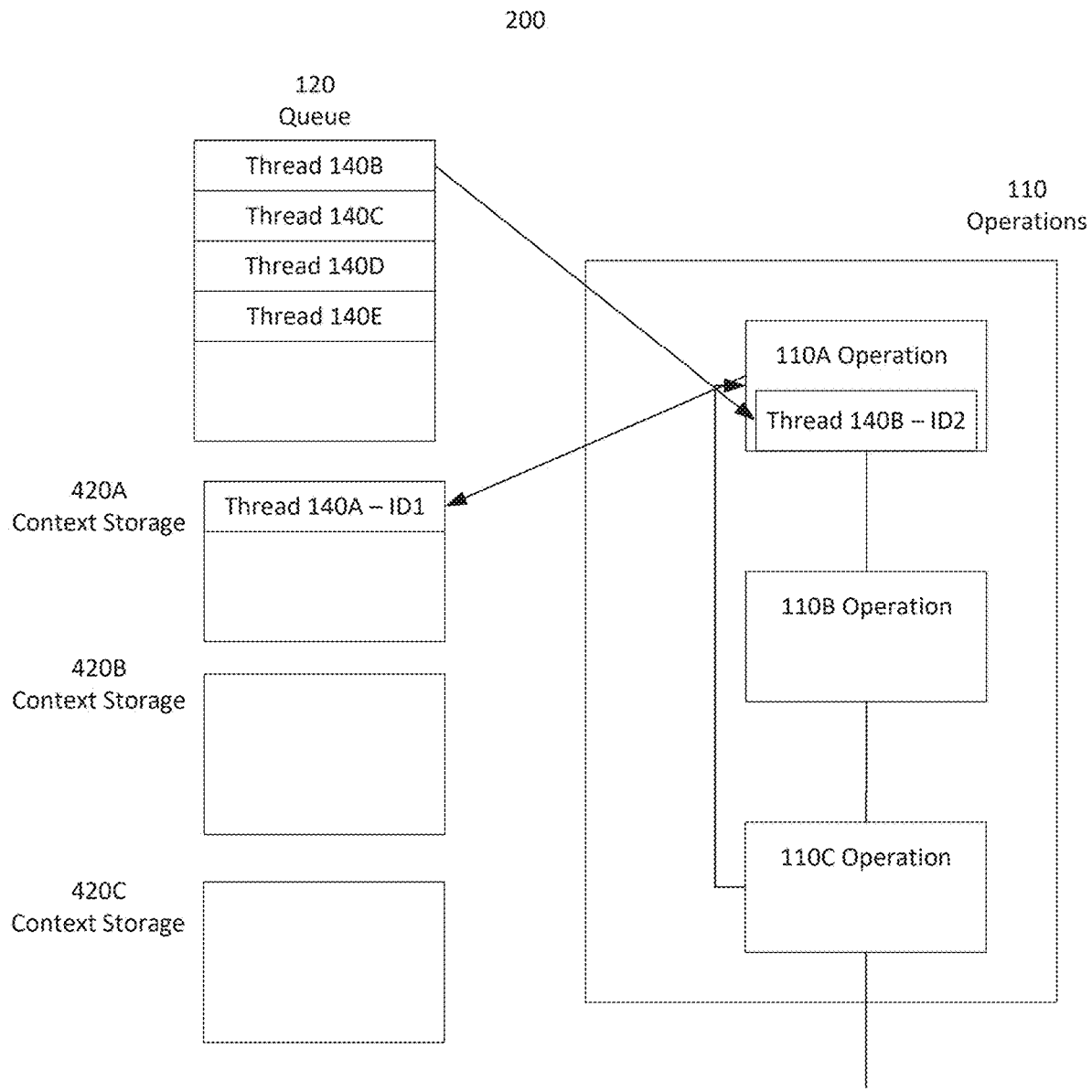
Figure 2C:
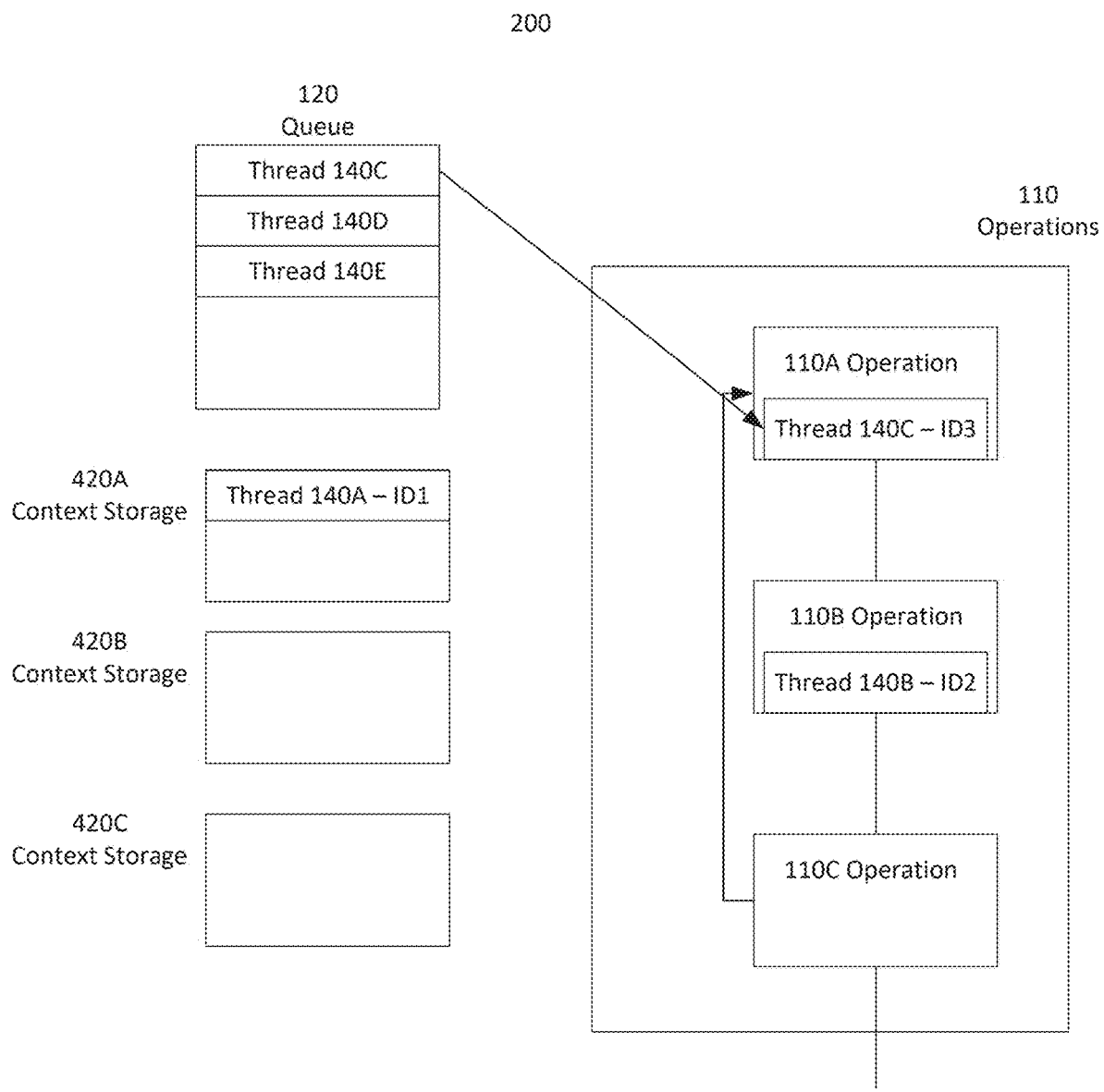
Figure 2D:
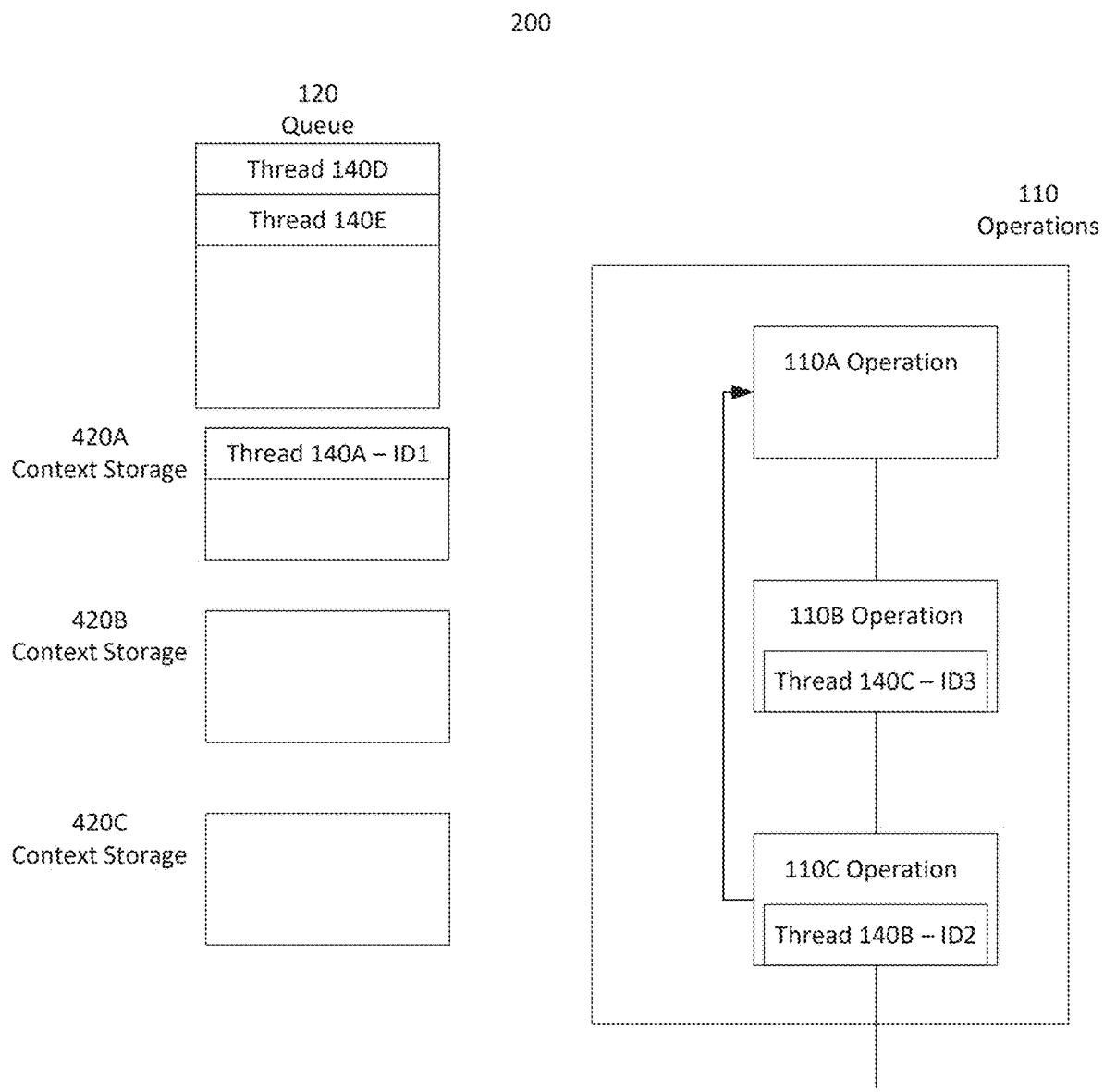

Referencing also FIG. 2C, thread 140B may complete executing operation 110A and move on to execute operation 110B, with thread 140C, assigned the identifier ID 3, starting execution of operation 110A. All this time, thread 140A may be waiting completion of operation 110A, with thread 140A's context stored in context storage 140A.

Since in such a solution a thread's context is identified by the identifier assigned to the thread and the identifier is unique in the pipeline, the number of threads that can execute concurrently in the pipeline 110 is limited by the number of possible unique identifiers, and each context storage must be able to store a context for all possible threads. Thus, the number of threads that can execute concurrently in the pipeline 110 is limited by the number of contexts that can be stored in a single context storage. In this example, each context storage can store up to three contexts. Thus, once thread 140A, thread 140B and thread 140C are executing concurrently in pipeline 110, thread 140D cannot start executing until one of these three completes executing the pipeline 110. Referencing also FIG. 2D, because thread 140A still has not completed operation 110A, there is no free identifier to assign to thread 140D and thus resources dedicated to executing operation 110A may remain idle. Furthermore, context storage 420B and context storage 420C, as well as part of context storage 420A, remain unused so long as other threads do not encounter long latencies in their execution.

Figure 2E:
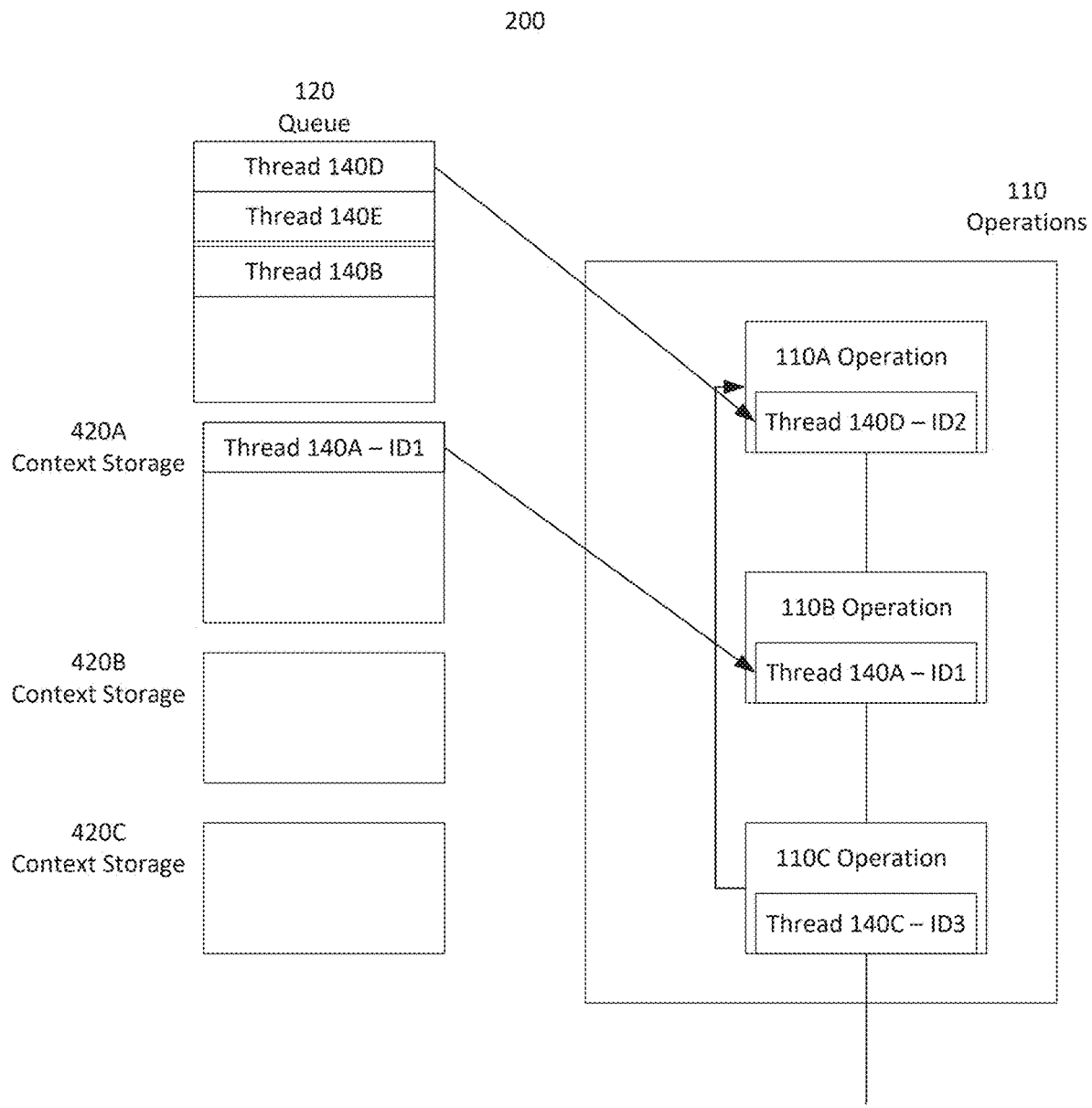

Referencing also FIG. 2E, when thread 140B completes executing the pipeline (and optionally returns to queue 120 for another iteration), ID 2 is released and may be assigned to thread 140D. Then thread 140D may execute operation 110A. When thread 140C completes executing operation 110B, thread 140C may move on to execute operation 110C, and now when thread 140A completes execution of operation 110A thread 140A may execute operation 110B.

This approach requires larger context storage at each computation element to accommodate all possible threads, possibly resulting in inefficient use of silicon real estate because some storage entries may remain unused at any given time. Furthermore, this approach limits the maximum number of concurrent threads to the number of unique identifiers available, which in turn is limited by the size of a context storage.

There is a need for a thread management system that enables out-of-order execution while efficiently utilizing context storage resources and supporting a larger number of concurrent threads.

The present disclosure, in at least some embodiments thereof, addresses the technical problem of increasing the number of concurrent threads executing in an execution pipeline of a plurality of operations. In addition, in some embodiments, the present disclosure further optimizes the use of context storage resources for out-of-order execution capabilities. To do so, in some embodiments described herewithin, when a thread enters the pipeline, the thread is assigned an identifier that identifies the thread's context in a context storage associated with a first operation in the pipeline, however the identifier may not be unique throughout the pipeline but rather can be used in another context storage associated with a different operation. Compared to the solution described above that uses unique identifiers throughout the pipeline, some embodiments described herewithin allow reducing the amount of context storage resources required to execute a given number of threads concurrently. Additionally, some embodiments allow using a given amount of context storage resources to execute concurrently more threads than possible according to the solution described above that uses unique identifiers, thus increasing throughput and additionally or alternatively reducing latency of executing the plurality of concurrent threads compared to an implementation that uses unique identifiers. In such embodiments, the maximum number of concurrent threads executable by the system is not constrained by the capacity of any individual context storage, for example as in the solution described above, but rather relates to the aggregate capacity of the plurality of context storages.

Reference is now made also to FIGS. 3A, 3B, 3C, 3D, 3E and 3F, showing schematic block diagrams of an exemplary processing framework 300 with context storages and reusable thread identification values, according to some embodiments. Referring again to FIG. 2D, in existing solutions as depicted in this figure, using identifiers that are unique throughout the pipeline prevented thread 140D from executing operation 110A as long as thread 140A, thread 140B and thread 140C were all executing concurrently in pipeline 110.

Figure 3A:
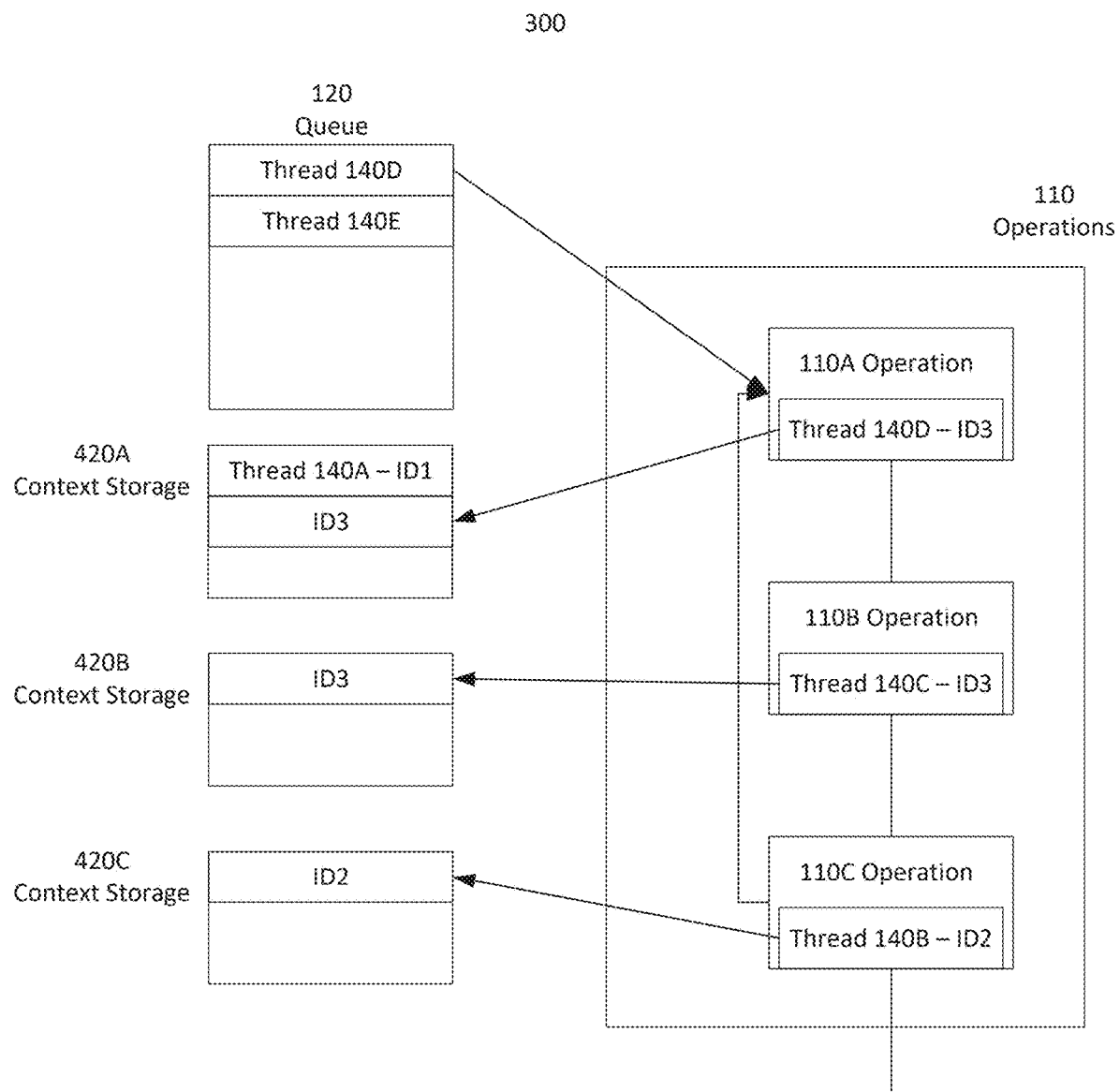
FIGS. 3A, 3B, 3C, 3D, 3E and 3F are schematic block diagrams of an exemplary processing framework with context storages and reusable thread identification values, according to some embodiments.

Referencing also FIG. 3A, context storage 420A that is associated with operation 110A is storing at this point only the thread context of thread 140A, identified by ID 1. ID 2 and ID 3 are available in context storage 420A, even though they are assigned to thread 140B and 140C respectively, which are executing operation 110C and operation 110B respectively.

According to some embodiments, since ID 3 is available in context storage 420A thread 140D can be associated with ID 3 and start execution of operation 110A. At this point, in this example ID 3 becomes unavailable in context storage 420A. Optionally, this is by storing the context of thread 140D in context storage 420A, identified by ID 3. Optionally, this is by marking in context storage 420A that ID 3 is not available.

Now in this example, pipeline 110 is executing concurrently four threads, namely thread 140B on operation 110C, thread 140C on operation 110B, thread 140D on operation 110A and thread 140A waiting for completion of operation 110A. However, only three identifiers are in use, namely ID 1, ID 2, and ID 3. Since thread 140D is associated with context storage 420A (through operation 110A) and thread 140C is associated with context storage 420B (through operation 110B) there is no conflict between them as they are associated with different context storages.

Figure 4:
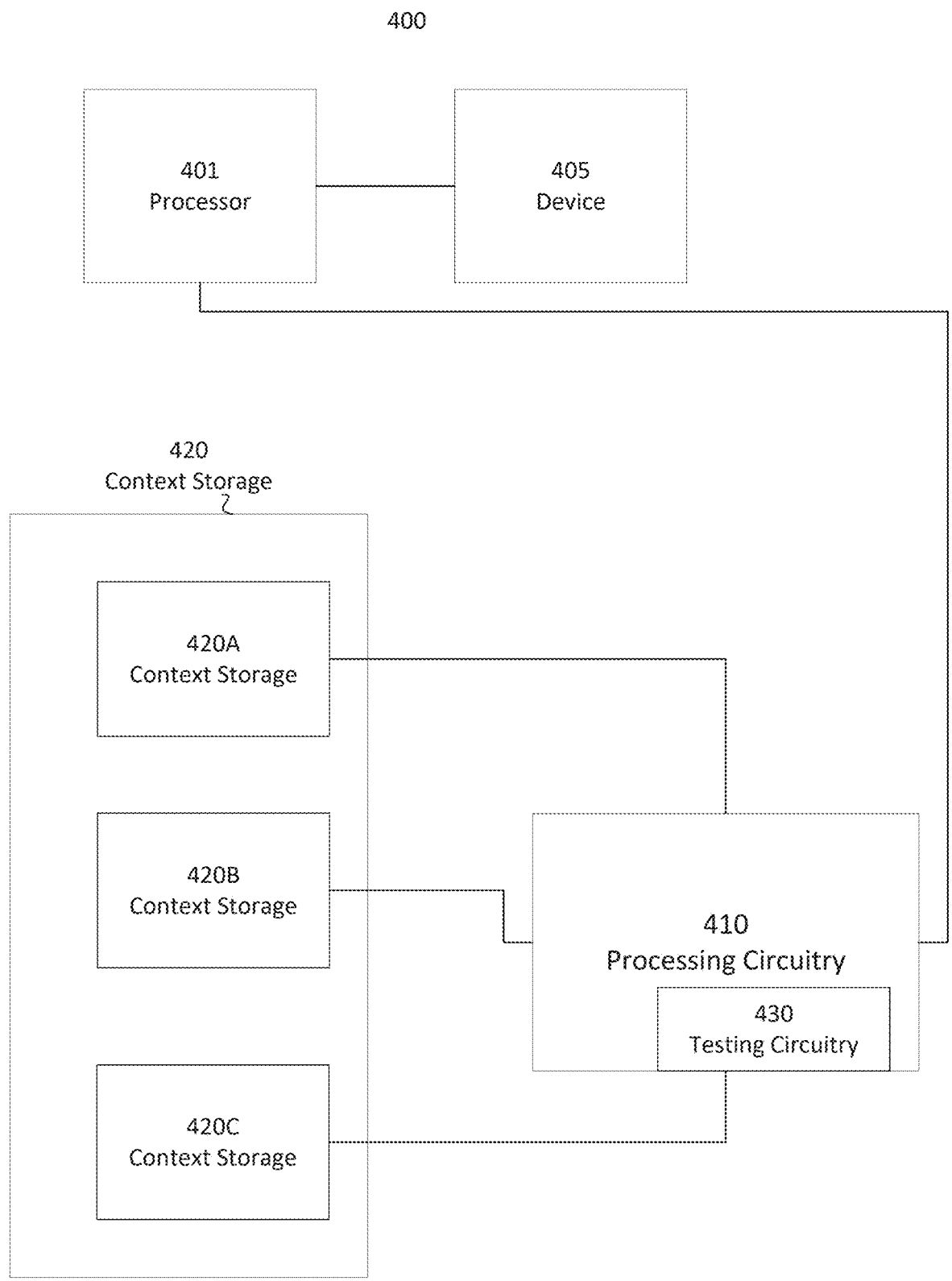
FIG. 4 is a schematic block diagram of an exemplary system, according to some embodiments.

Optionally, at least one operation of the plurality of operations comprises a memory access operation. Optionally, at least one operation of the plurality of operations comprises a mathematical operation. Some examples of a mathematical operation include, but are not limited to, a floating-point mathematical operation, a fixed-point mathematical operation, and integer mathematical operation and a Boolean mathematical operation. Optionally, at least one operation of the plurality of operations comprises executing another computation graph. Optionally, executing the other computation-graph can be as a result of executing a control-flow instruction. Some examples of a control-flow instruction include, but are not limited to, a jump instruction, a branch instruction, a function call instruction and a conditional switch instruction. Optionally, at least one operation of the plurality of operations comprises an access to a peripheral device 405 connected to processing circuitry 410 (FIG. 4). Some examples of a peripheral device include, but are not limited to, a sensor, an input device, a storage device and a network interface.

Again, as noted above, each of operation 110A, operation 110B and operation 110C may be a group of operations, organized in a sub-pipeline of pipeline 110. It may be that more than one thread is executing simultaneously operation 110A, in a pipeline. However, each of the plurality of operations 110 has at least one operation with an unpredictable latency, and for the simplicity of the description the present disclosure uses the terms "operation 110A", "operation 110B" and operation "110C" to refer to the at least one operation with unpredictable latency in the group of operations.

Figure 3B:
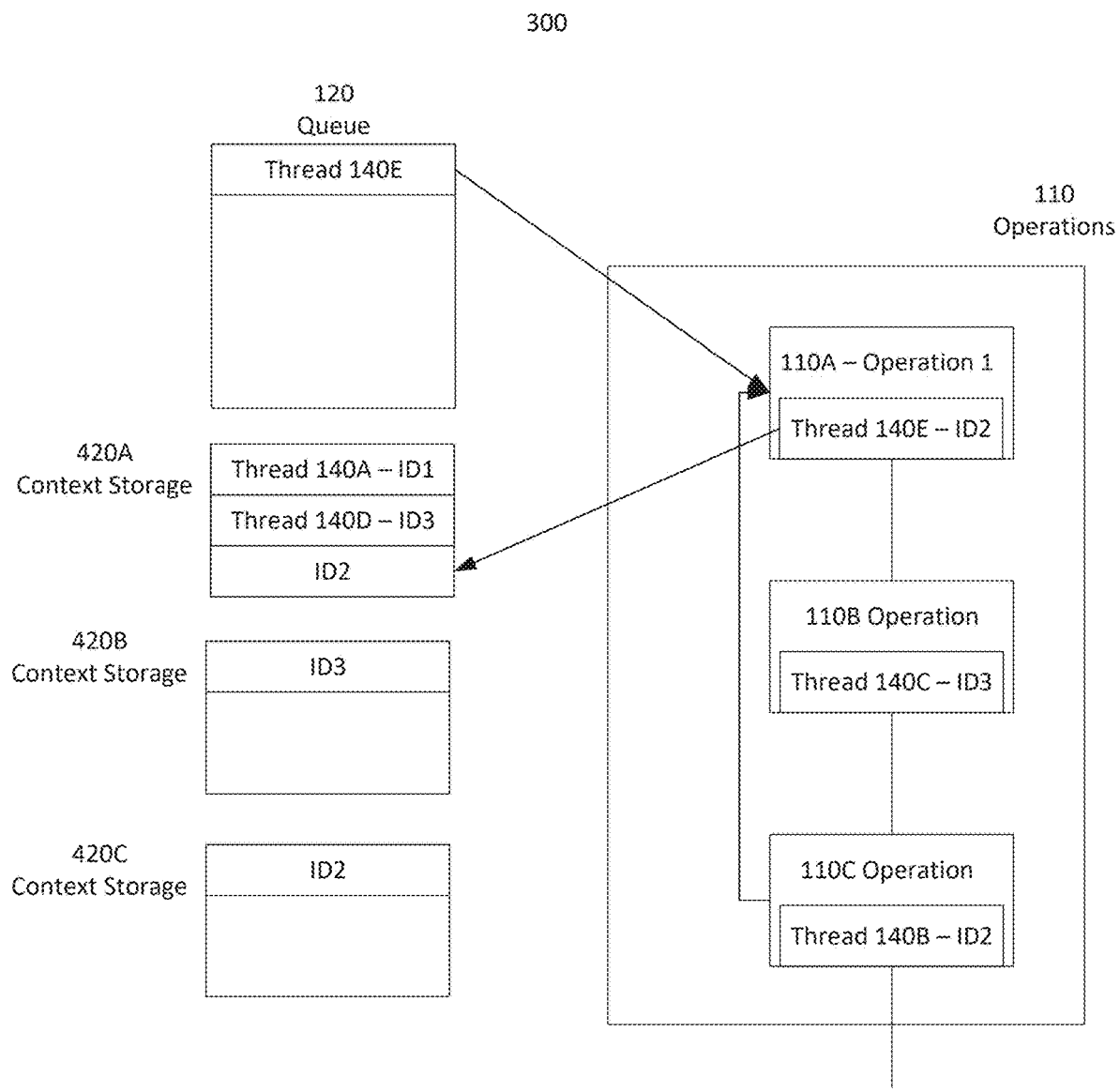

Referencing also FIG. 3B, while thread 140D is waiting for completion of operation 110A its storage is stored in context storage 420A. Thread 140E may be associated with ID 2 that is available in context storage 420A and may execute operation 110A. Now in this example pipeline 110 is executing concurrently five threads, namely thread 140B on operation 110C, thread 140C on operation 110B, thread 140E on operation 110A and thread 140A and thread 140D waiting for completion of operation 110A, while still using only three identifiers. At this point, in this example ID 2 becomes unavailable in context storage 420A. Optionally, this is by storing the context of thread 140E in context storage 420A, identified by ID 2. Optionally, this is by marking in context storage 420A that ID 2 is not available.

Figure 3C:
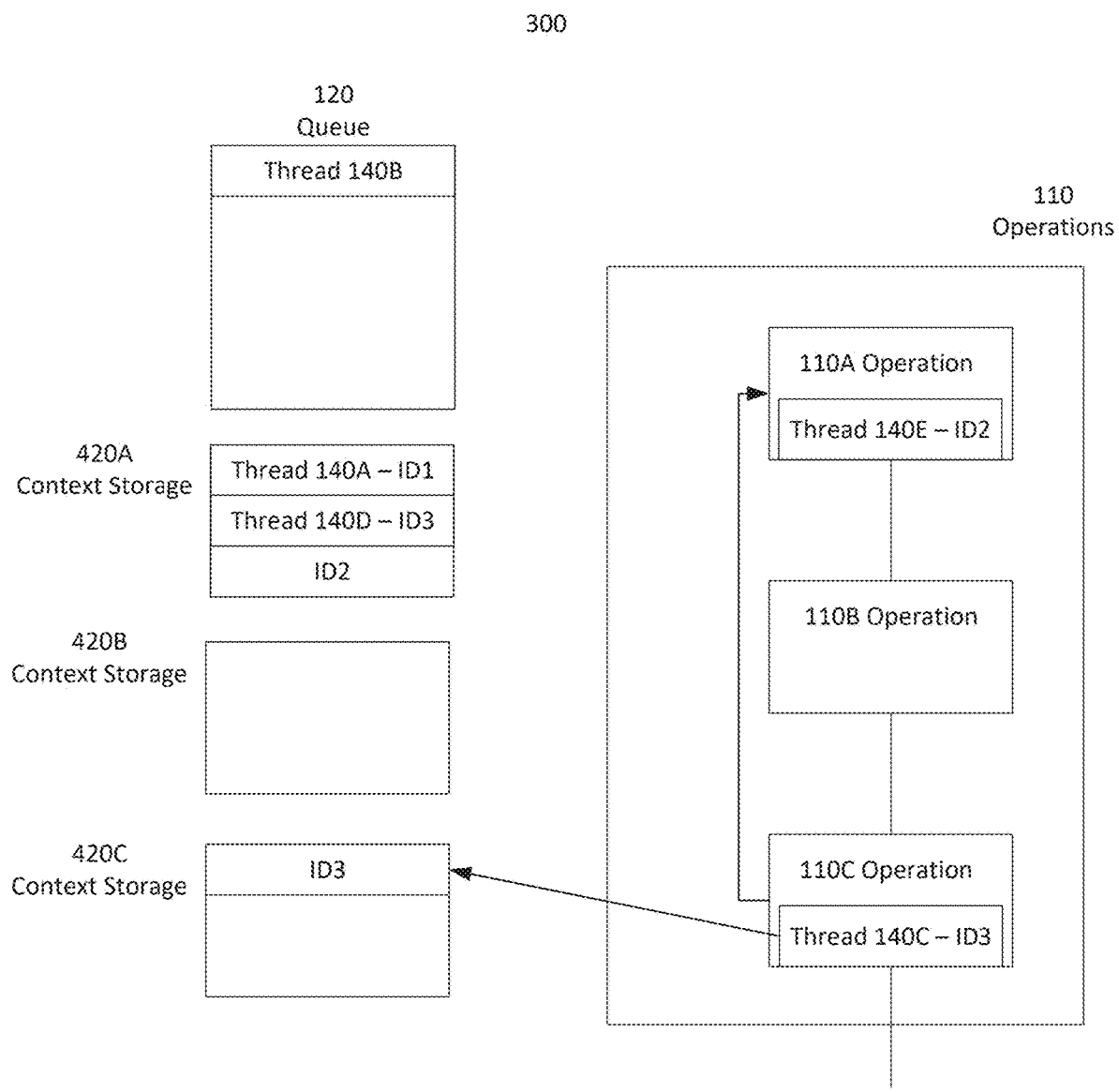

Referencing also FIG. 3C, after thread 140C completes execution of operation 110C, since ID 3 is available in context storage 420C thread 140C may execute operation 110C, at which point ID 3 becomes unavailable in context storage 420C. In addition, ID 3 becomes available in context storage 420B.

Figure 3D:
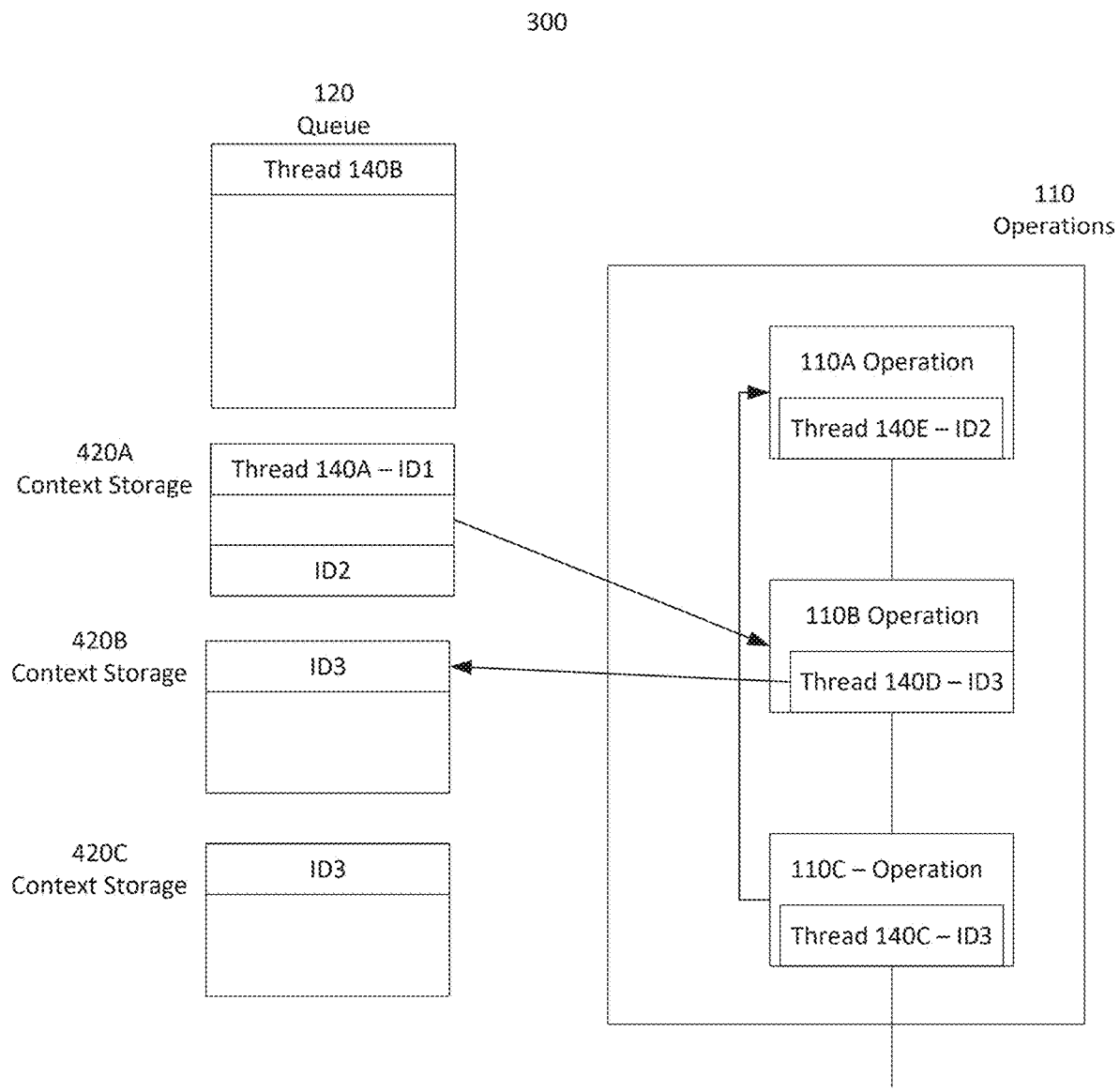

Referencing also FIG. 3D, since ID 3 has become available in context storage 420B thread 140D may execute operation 110B. At this point, ID 3 again becomes unavailable in context storage 420B. In addition, ID 3 becomes available in context storage 420A. When thread 140B executes pipeline 110 in a loop in a plurality of iterations, after executing operation 110C thread 140B may return to queue 120.

Figure 3E:
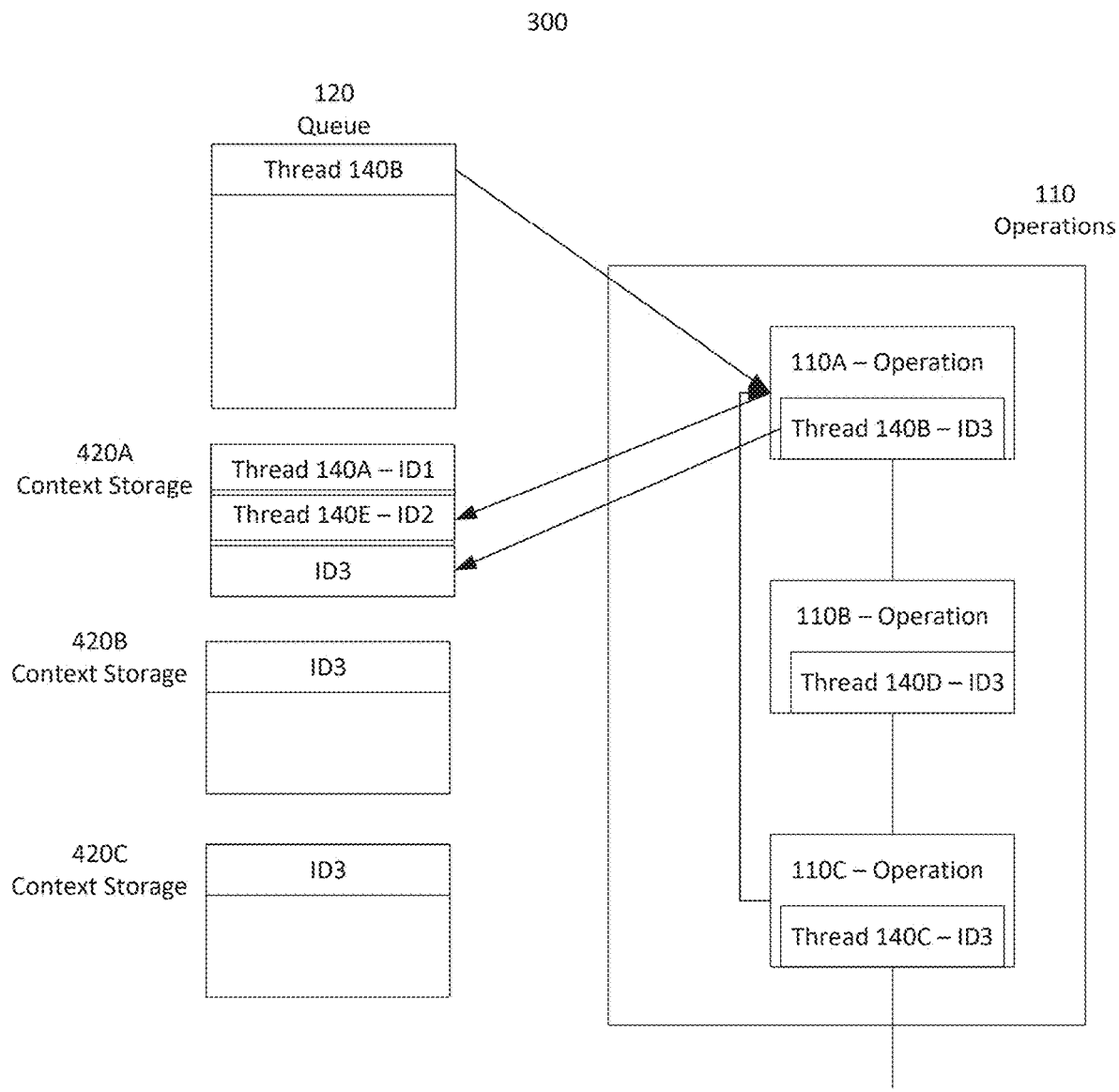
Figure 3F:
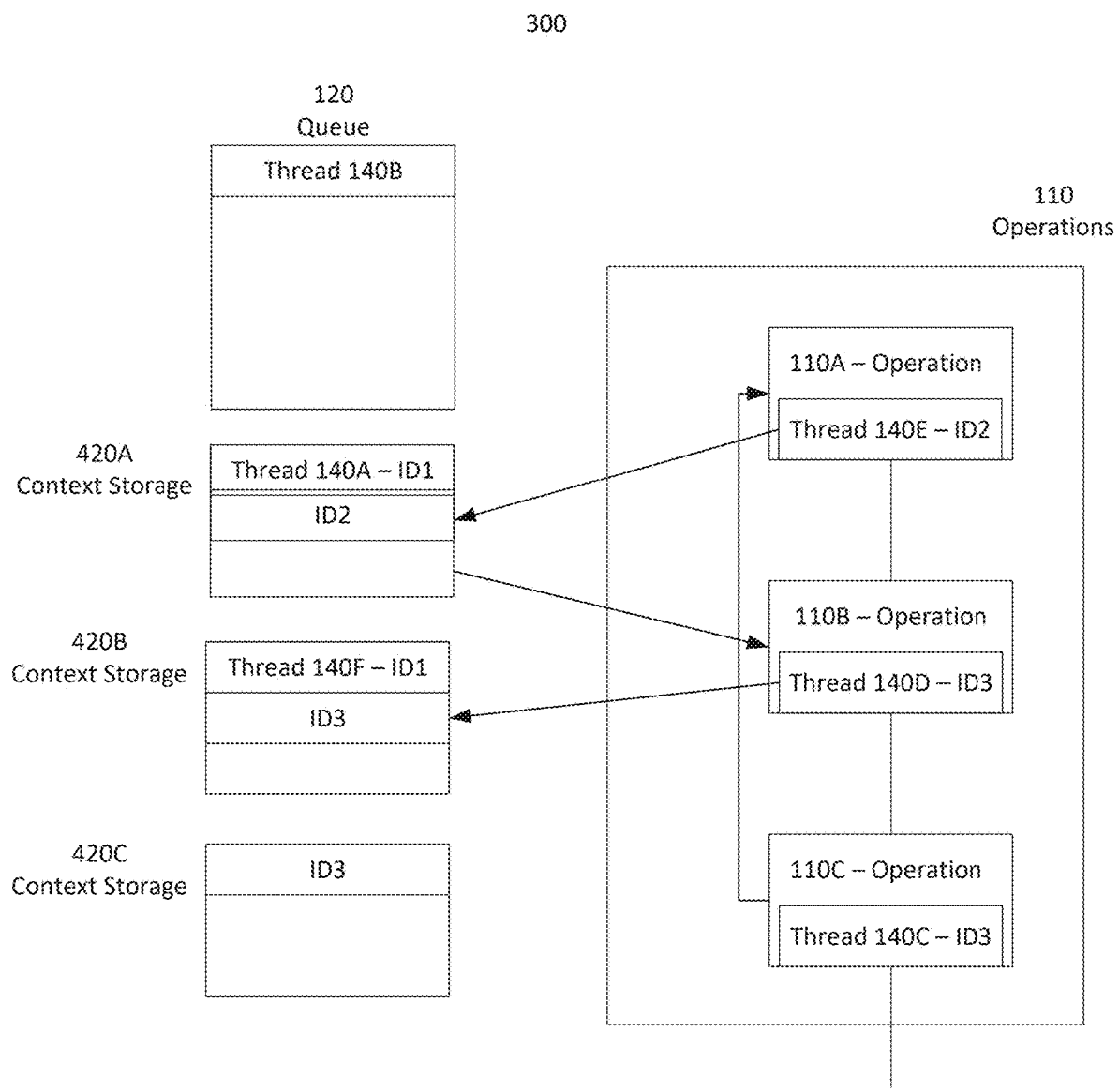

Referencing also FIG. 3E, while thread 140F is awaiting completion of execution of operation 110A, the context of thread 140E is stored in context storage 420A, identified by ID 2. Since ID 3 is available in context storage 420A thread 140B may execute 110A again, this time with thread 140B associated with ID 3 (whereas in its previous iteration in pipeline 110 thread 140B was associated with ID 2). At this point ID 3 becomes unavailable in context storage 420A.

In some embodiments the present solution allows out of order execution of threads that have different identifiers, while threads that share a common identifier execute in order. Referencing also FIG. 3F, the plurality of threads 140 may comprise also thread 140G, which optionally started executing before thread 140D and is awaiting completion of execution of operation 110B. In this example, thread 140E is associated with ID 1 and its context is stored in context storage 420B that is associated with operation 110B. Thread 140A may complete execution of operation 110A, however since ID 1 is not available in context storage 420B thread 140A cannot execute operation 110B. Instead, thread 140D, associated with ID 3, may free context storage 420A and execute operation 110B, at which point ID 3 becomes unavailable in context storage 420B. In this example, thread 140F and thread 140A which are both associated with a common identifier ID 1 execute in order, whereas thread 140D and thread 140A that are associated with different identifiers may execute out of order, with thread 140D progressing through pipeline 110 before thread 140A even though thread 140D started execution after thread 140A.

Other solutions that use buffering for reordering threads using unique identification values for the threads require at each operation an amount of buffering that can support the latency of the entire FIFO 110. The present solution has an advantage over such solutions as it allows, in some embodiments thereof, using a context storage that supports the latency of one operation only, reducing the amount of memory required to implement the plurality of context storages.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made also to FIG. 4, showing a schematic block diagram of an exemplary system 400, according to some embodiments. In such embodiments, at least one hardware processor 401 is connected to one or more processing circuitry 410. Some examples of a processing circuitry include, but are not limited to, a central processing unit (CPU), a data processing unit (DPU), a multi-core central processing unit (multi-core CPU), a microcontroller unit (MCU), an accelerated processing unit (ACU), a field-programmable gate array (FPGA), a coarse-grained reconfigurable architecture (CGRA), a neural-network accelerator, an intelligence processing unit (IPU), an application-specific integrated circuit (ASIC), a quantum computer, a superscalar processor and a hyperthreading processor.

Optionally, plurality of context storages 420 is connected to one or more processing circuitry 410. For brevity, henceforth the term "processing unit" is used to mean at least one hardware processor and the terms are used interchangeably. The processing unit may be any kind of programmable or non-programmable circuitry that is configured to carry out the operations described above and below. The processing unit may comprise hardware as well as software. For example, the processing unit may comprise one or more processors and a transitory or non-transitory memory that carries a program which causes the processing unit to perform the respective operations when the program is executed by the one or more processors.

Optionally, each of plurality of context storages 420 is configured to store a plurality of thread contexts. Optionally each thread context of the plurality of thread contexts is for one of plurality of concurrent threads 140. Optionally, each of the plurality of context storages 420 comprises a plurality of context entries. Optionally, each context entry of the plurality of context entries is for storing a plurality of runtime context values of one of the plurality of thread contexts stored in the context storage. Optionally the plurality of context entries are organized in an array. Optionally, the plurality of context entries are organized in a hash table. Optionally the plurality of context entries are indexed by a thread identification value.

Optionally, each of the plurality of context storages 420 is associated with one or more operations of the plurality of concurrent threads 140. Optionally, a context storage of plurality of context storages 420 is used to store a thread context of each of the plurality of concurrent threads 140 while waiting for completion of execution of the one or more operations associated with the context storage, for the thread.

Optionally, one or more processing circuitry 410 is connected to one or more testing circuitry 430. Optionally, one or more testing circuitry 430 is used to apply an availability test for a thread identification value to test whether the thread identification value is available in a context storage of plurality of context storages 420. Optionally, the availability test is applied when selecting a thread of the plurality of threads to execute the pipeline 110. Optionally, the availability test is applied when a thread completes execution of one of the plurality of operations 110 and is ready to move to a following operation in the pipeline 110. Optionally, one or more processing circuitry 410 comprise the one or more testing circuitry 430. Optionally, one or more processing circuitry 410 comprise processing unit 401.

Figure 5:
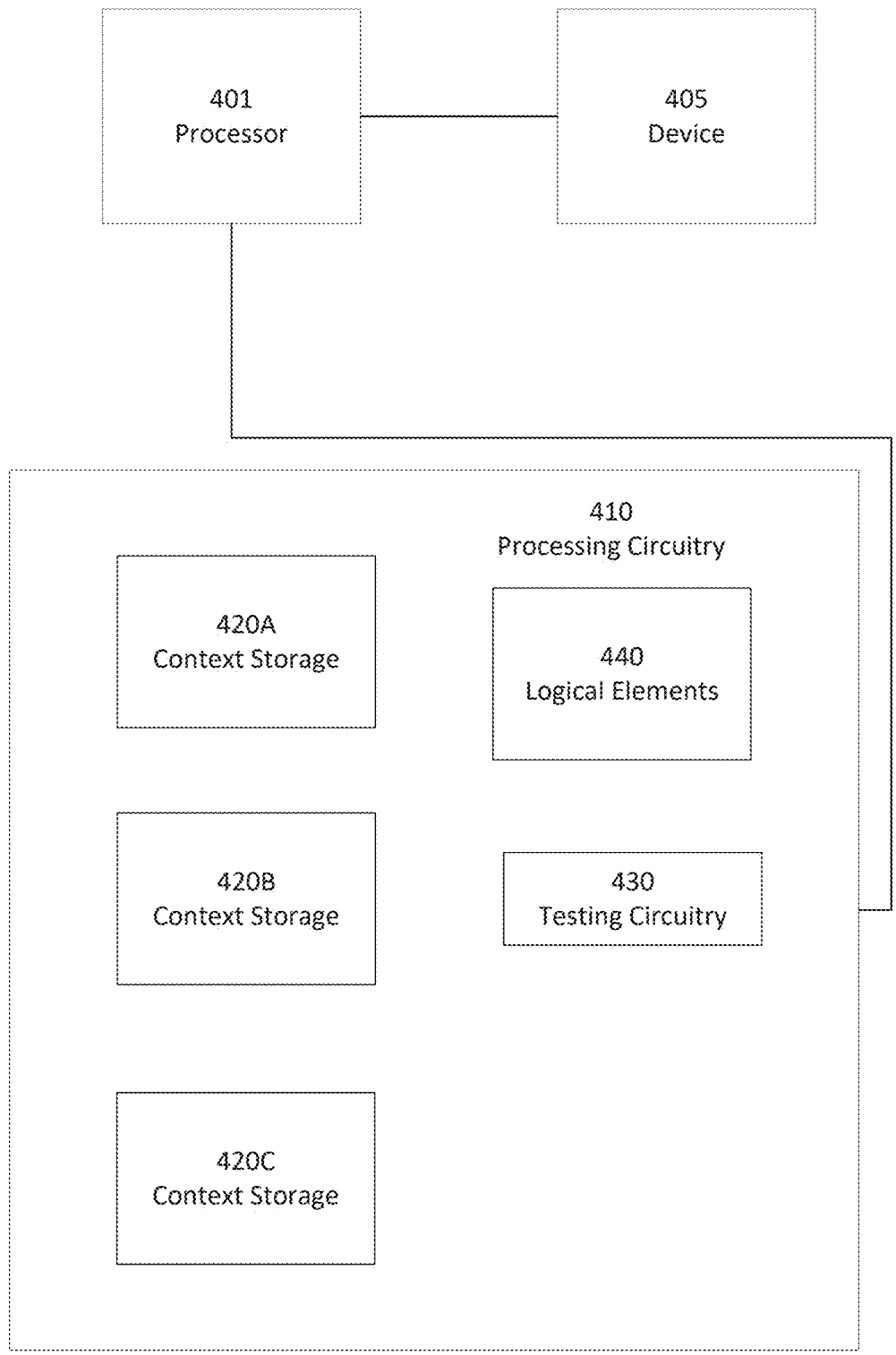
FIG. 5 is a schematic block diagram of another exemplary system, according to some embodiments.

In some embodiments one or more processing circuitry 410 comprise one or more reconfigurable processing grids. Reference is now made also to FIG. 5, showing a schematic block diagram of another exemplary system 500, according to some embodiments. In such embodiments, at least one of the one or more processing circuitry 410 is a reconfigurable processing grid. Optionally, the reconfigurable processing grid comprises a plurality of logical elements 440. Optionally, plurality of logical elements 440 is connected by a plurality of reconfigurable data routing junctions. Optionally, processing unit 401 configures the reconfigurable processing grid to execute one or more operations of plurality of operations 110. Optionally, each of the one or more operations of plurality of operations 110 is implemented by part of the reconfigurable processing grid. Optionally, processing unit 401 configures the reconfigurable processing grid to execute at least part of one or more of the methods described below. Optionally, configuring the reconfigurable processing grid comprises manipulating one or more of the plurality of logical elements 440, and additionally or alternatively manipulating one or more of the plurality of routing junctions connecting the plurality of logical elements 440. Optionally, processing unit 401 configures the reconfigurable processing grid while the one or more reconfigurable processing grid executes at least some of the plurality of concurrent threads 140.

In some embodiments described herewithin, plurality of concurrent threads 140 are at least part of a plurality of threads of a software program executed by system 400 or system 500. Optionally, each of plurality of concurrent threads 140 implements a common dataflow graph, such that plurality of operations 110 are at least part of the common dataflow graph. Optionally, the common dataflow graph is implemented by configuring a subset of the plurality of logical elements 440 in the reconfigurable processing grid. Optionally, each operation of the plurality of operations corresponds to one or more logical elements of plurality of logical elements 440.

In some embodiments, system 400 or system 500 are configured to execute plurality of concurrent threads 140. Optionally, each of the plurality of operations 110 is executed by a subset of the plurality of processing circuitries 410. To execute plurality of concurrent threads 140, system 400 or system 500 may implement the following optional method.

For brevity, unless otherwise noted henceforth the term "processing circuitry" is used to mean "one or more processing circuitry" and the terms are used interchangeably.

Figure 6:
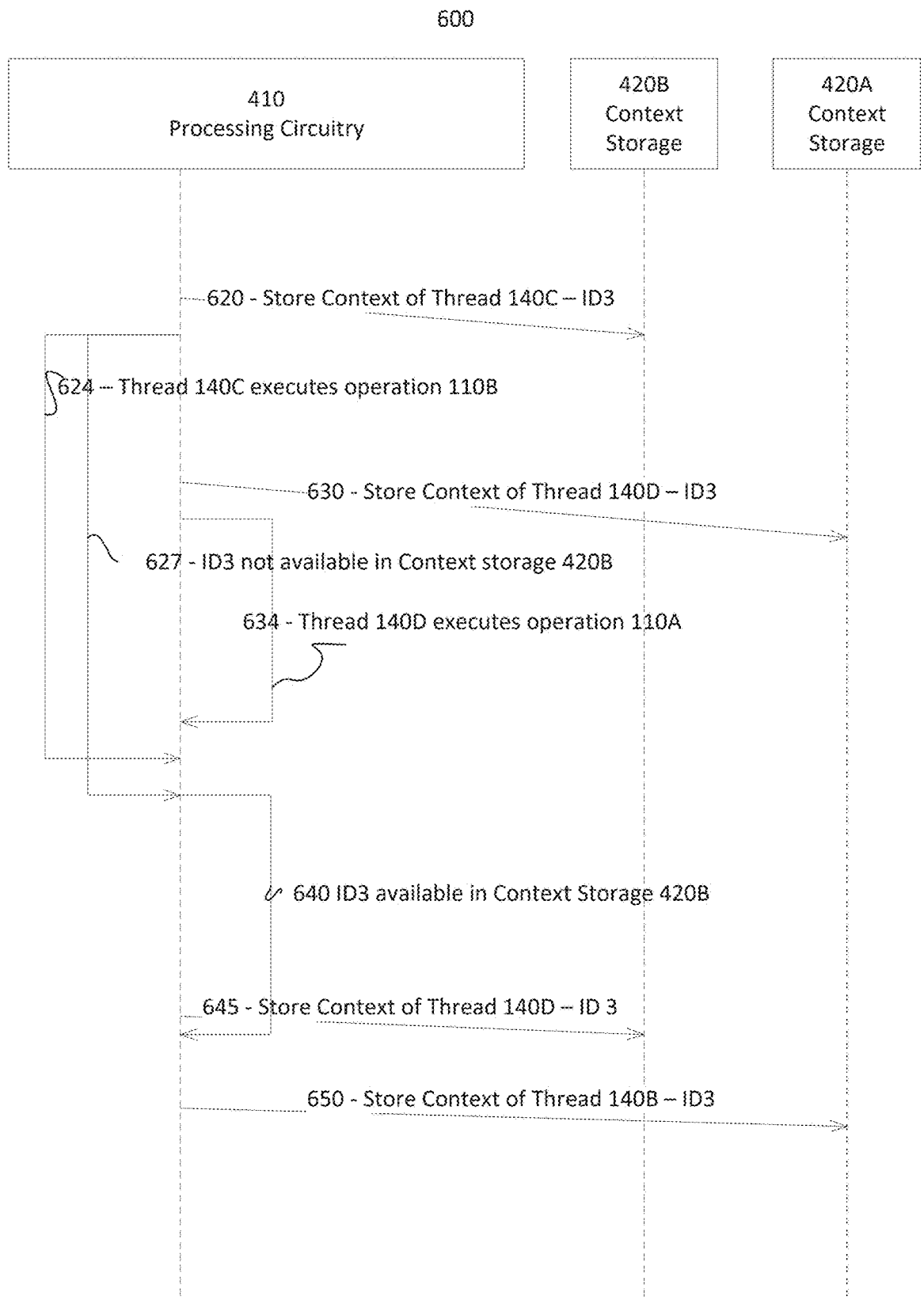
FIG. 6 is a sequence diagram of an optional flow of operations, according to some embodiments.
Figure 7:
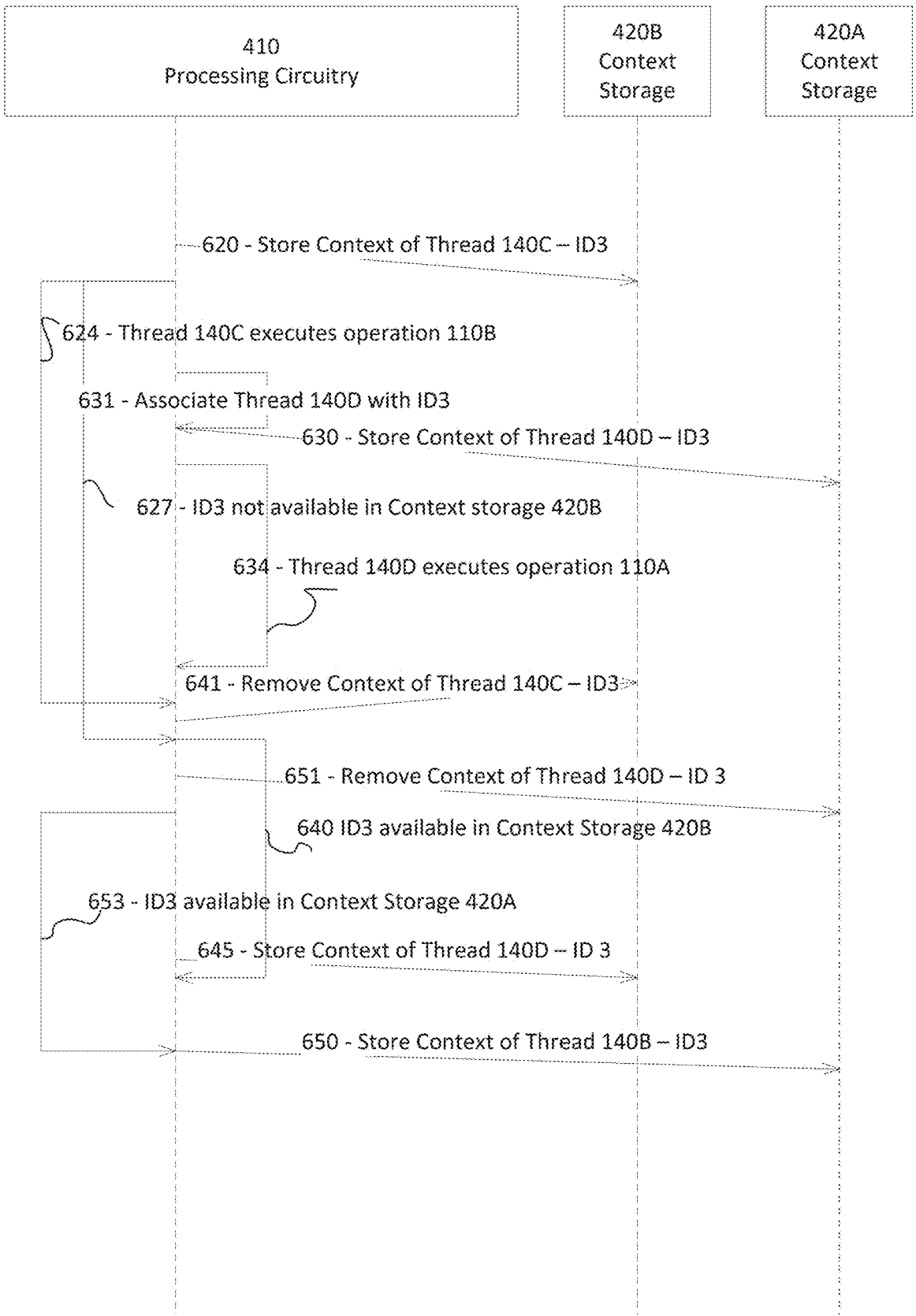
FIG. 7 is a sequence diagram of another optional flow of operations, according to some embodiments.
Figure 8:
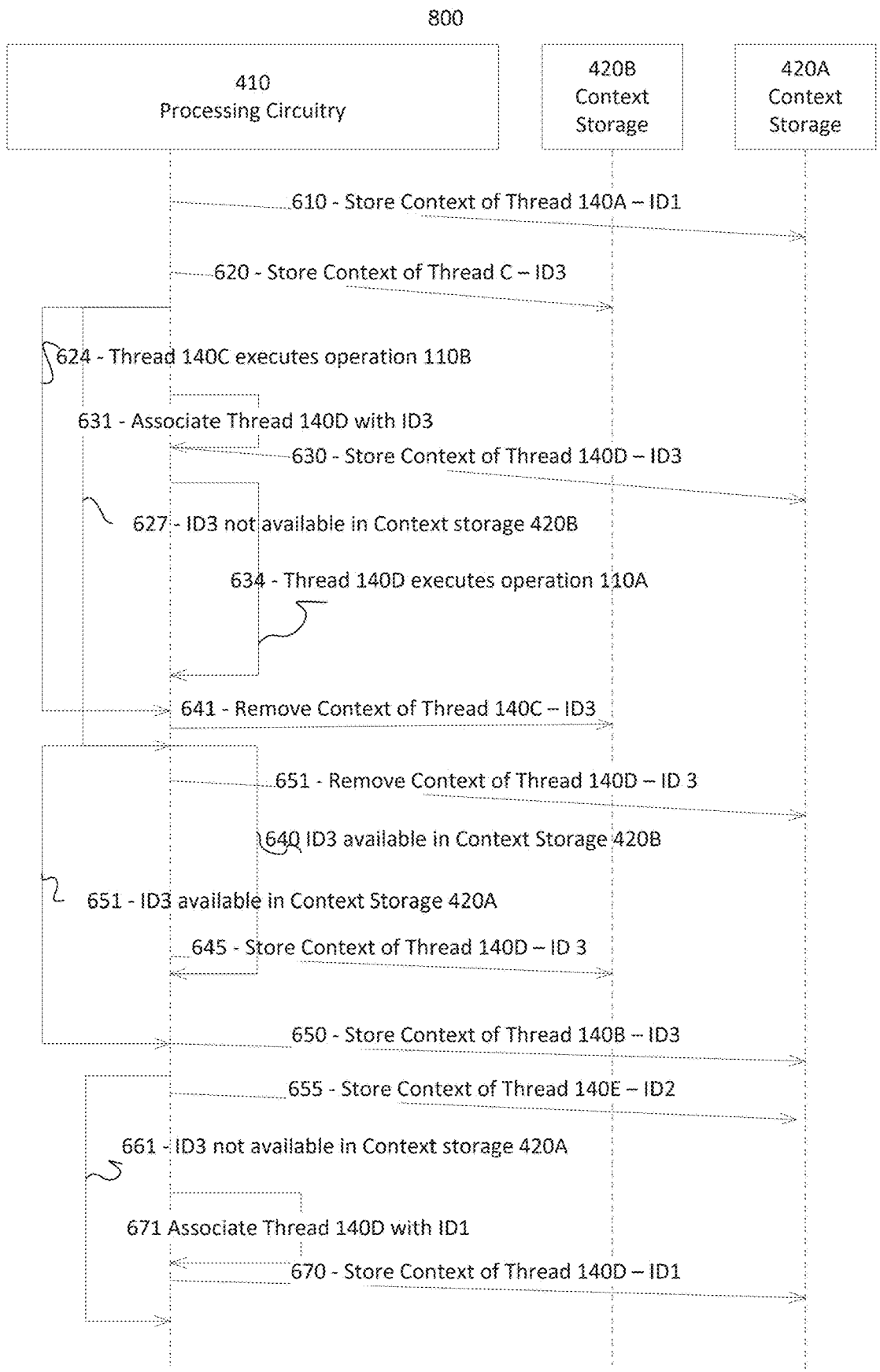
FIG. 8 is a sequence diagram of yet another optional flow of operations, according to some embodiments.

Reference is now made also to FIGS. 6, 7, and 8, which illustrate the temporal relationships between operations performed by the processing circuitry 410, the plurality of context storages 420, and the plurality of concurrent threads 140 according to various embodiments. In these figures, the vertical dotted lines represent lifelines for different system components, with time progressing from top to bottom. For visual clarity, a separate lifeline is shown for each component, but these all operate within the same temporal framework.

Reference numbers used in these sequence diagrams correspond to the same elements introduced in earlier figures but are now arranged to show their temporal relationships and interactions during thread execution. Each figure demonstrates a different aspect of the thread management process: FIG. 6 illustrates the basic flow of concurrent thread execution and context storage management, FIG. 7 shows the storing of thread-ID associations and context removal from storage, and FIG. 8 demonstrates out-of-order execution capabilities and backend operations.

Reference is now made also to FIG. 6, showing a sequence diagram of an optional flow of operations 600, according to some embodiments. Optionally, processing circuitry 410 executes simultaneously plurality of threads 140. For example, in 634 processing circuitry 410 may execute operation 110A of a first thread, for example thread 140D concurrently to executing in 624 operation 110B of a second thread, for example thread 140C. Optionally, in 630 processing circuitry 410 stores a first thread context of thread 140D in context storage 420A. Optionally, the first thread context of thread 140D is identified in context storage 420A by ID 3. Optionally, executing operation 110A of thread 140D comprises modifying one or more values stored in context storage 420A.

Optionally, in 620 processing circuitry 410 stores a second thread context of thread 140C in context storage 420B, where optionally the second thread context of thread 140C is identified by ID 3.

While the second context of thread 140C is stored in context storage 420B, ID 3 may not be available for another thread in context storage 420B. Thus, in 627, an outcome of applying an availability test to ID 3, optionally by testing circuitry 430, may indicate that ID 3 is not available in context storage 420B, optionally starting after storing the second thread context of thread 140C in context storage 420B and before completing execution of operation 110B in 624. While an outcome of applying the availability test to ID 3 indicates that ID 3 is not available in context storage 420B, (i.e. the duration of 627), optionally processing circuitry continues to store the first thread context of thread 140D in context storage 420A.

In 640, after thread 140C completes execution of operation 110B, an outcome of applying the availability test by testing circuitry 430 to ID 3 may indicate that ID 3 is available in context storage 420B.

When first thread 140D completes execution of operation 110A in 634, and when in 640 the outcome of applying the availability test by testing circuitry 430 to ID 3 indicates that ID 3 is available in context storage 420B, in 645 processing circuitry 410 optionally stores the first context of thread 140D in context storage 420B. Optionally, storing the first context of thread 140D in context storage 420B comprises modifying one or more of the plurality of runtime context values of the first context of thread 140D. Optionally, storing the first context of thread 140D in context storage 420B comprises storing one or more other values, modified when executing operation 110A.

Optionally, applying the availability test to ID 3 comprises an attempt to consume a credit associated with ID 3 and context storage 420B. Optionally, the credit is produced by context storage 420B and is consumed by testing circuitry 430 when ID 3 is available in context storage 420B, thus indicating that ID 3 is available in context storage 420B. Optionally when ID 3 is not available in context storage 420B testing circuitry 430 fails to consume the credit, thus indicating that ID 3 is not available in context storage 420B.

Optionally, removing the first thread context of thread 140D from context storage 420A allows context storage 420A to produce another credit associated with ID 3 and context storage 420A. Optionally, when the first thread context of thread 140D is removed from context storage 420A processing circuitry ceases to identify the first context of thread 140D in context storage 40A by ID 3. Optionally, in 650 processing circuitry 410 stores in context storage 420A a third context of third thread 140B, the third context optionally identified therein by ID 3. Optionally storing the third context in context storage 420A comprises consuming the other credit by testing circuitry 430, when testing whether ID 3 is available in context storage 420A.

Reference is now made also to FIG. 7, showing a sequence diagram of another optional flow of operations 700, according to some embodiments.

Optionally, the plurality of context storages 420 comprise a sequence of context storages. Optionally, first context storage 420A has no preceding context storage in the sequence of context storages. Optionally, context storage 420C is an exit context storage, having no succeeding context storage in the sequence of context storage.

Optionally, before storing the first context of thread 140D in context storage 420A, in 631 processing circuitry 410 associates thread 140D with ID 3 and stores this association. Thus, thread 140D is associated with ID 3 until execution of thread 140D completes for one run of pipeline 110, and the first context of thread 140D, when stored in any of plurality of context storages 420, is identified by ID 3 during that one run. Optionally, the association is stored in a memory component managed by processing circuitry 410. Optionally, the memory component can store an association between identification value and a set of threads of the plurality of concurrent threads. Optionally for each of the plurality of concurrent threads the memory component can store an association with an identification value.

In 641, when thread 140C completes execution of operation 110B, processing circuitry 410 optionally removes the second context of thread 140C from context storage 420B. Optionally, processing circuitry 410 provides testing circuitry 430 with one or more token values that indicate that ID 3 is available in context storage 420B. A token may be the identification value ID 3. Testing circuitry 130 may use the token to update an internal indication that ID 3 is available in context storage 420B. Optionally, a token includes an explicit availability indication value. Optionally a token includes a status value indicative of a status of context storage 420B. Optionally, testing circuitry 430 stores at least one of the one or more token values and uses the at least one token value when applying the availability test.

In 640, ID 3 may become available in context storage 420B after the second context of thread 140C is removed from context storage 420B.

In 651, processing circuitry 410 optionally removes the first thread context of thread 140D from context storage 420A, such that in 653 applying the availability test to ID 3 optionally indicates that ID 3 is available in context storage 420A. Optionally, processing circuitry 410 removes the first thread context from context storage 420A when ID 3 becomes available in context storage 420B. Optionally, processing circuitry 410 removes the first thread context of thread 140D from context storage 420A based on an outcome of other processing done by processing circuitry 410. Optionally, removing the first thread context from context storage 420A comprises updating a validity indicator for an entry storing the first thread context of thread 140D. Optionally, removing the first thread context from context storage 420A comprises updating an availability of ID 3 in context storage 420A.

When processing circuit 410 executes thread 140B simultaneously to executing thread 140D and thread 140C, when in 653 applying the availability test to ID 3 indicates that ID 3 is available in context storage 420A, allowing processing circuitry 410 to optionally store in 650 the third context of thread 140B in context storage 420A identified by ID 3.

In some embodiments, the present disclosure enables executing a thread of the plurality of concurrent threads in a loop, repeating execution of the thread in the pipeline 110 in each of a plurality of iterations. In addition, the present disclosure enables in some embodiments out of order execution of threads. Reference is now made also to FIG. 8, showing a sequence diagram of yet another optional flow of operations 800, according to some embodiments.

Optionally, before storing first thread context of thread 140D in context storage 420A identified by ID 3, and before storing second thread context of thread 140C in context storage 420B identified by ID 3, in 610 processing circuitry 410 stores and stores a fourth thread context of a fourth thread 140A in context storage 420A, identified by ID 1. Optionally, thread 140C progresses in the pipeline 110 and executes operation 110B before thread 140A completes execution of operation 110A even though thread 140A began execution of operation 110A before thread 140C executed operation 110A.

In 661, an outcome of an availability test applied to ID 3 optionally indicates that ID 3 is not available in context storage 420A, optionally because the third context of thread 140B is stored in context storage 420A and identified by ID 3. In 655 processing circuitry 420 optionally stores a fifth context of fifth thread 140E in context storage 420A identified by ID 2, which is optionally available.

When thread 140D completes execution of operation 110C which is associated with exit context storage 420C processing circuitry may remove the association between thread 140D and ID 3. Optionally, thread 140D executes pipeline 110 at least one more time, optionally first being added to queue 120. When thread 140D executes pipeline 110 in another iteration and applying the availability test in 661 indicates that ID 3 is not available in context storage 420A, in 671 processing circuitry 410 may perform a new association between thread 140D and ID 1 and store the new association, and in 670 optionally store a new first context of thread 140D in context storage 420A identified by ID 1, and not ID 3 as in a previous iteration. Optionally, the new association is performed when removing the association between thread 140D and ID 3. Optionally, the new association is performed when thread 140D is selected from queue 120 to execute pipeline 110. A context of a thread may be preserved on the back-edge, when executing the pipeline 110 one or more additional times. Thus, the new first context of thread 140D optionally comprises at least some runtime context values of the plurality of runtime context values of the first thread context that was stored in a previous iteration.

Figure 9:
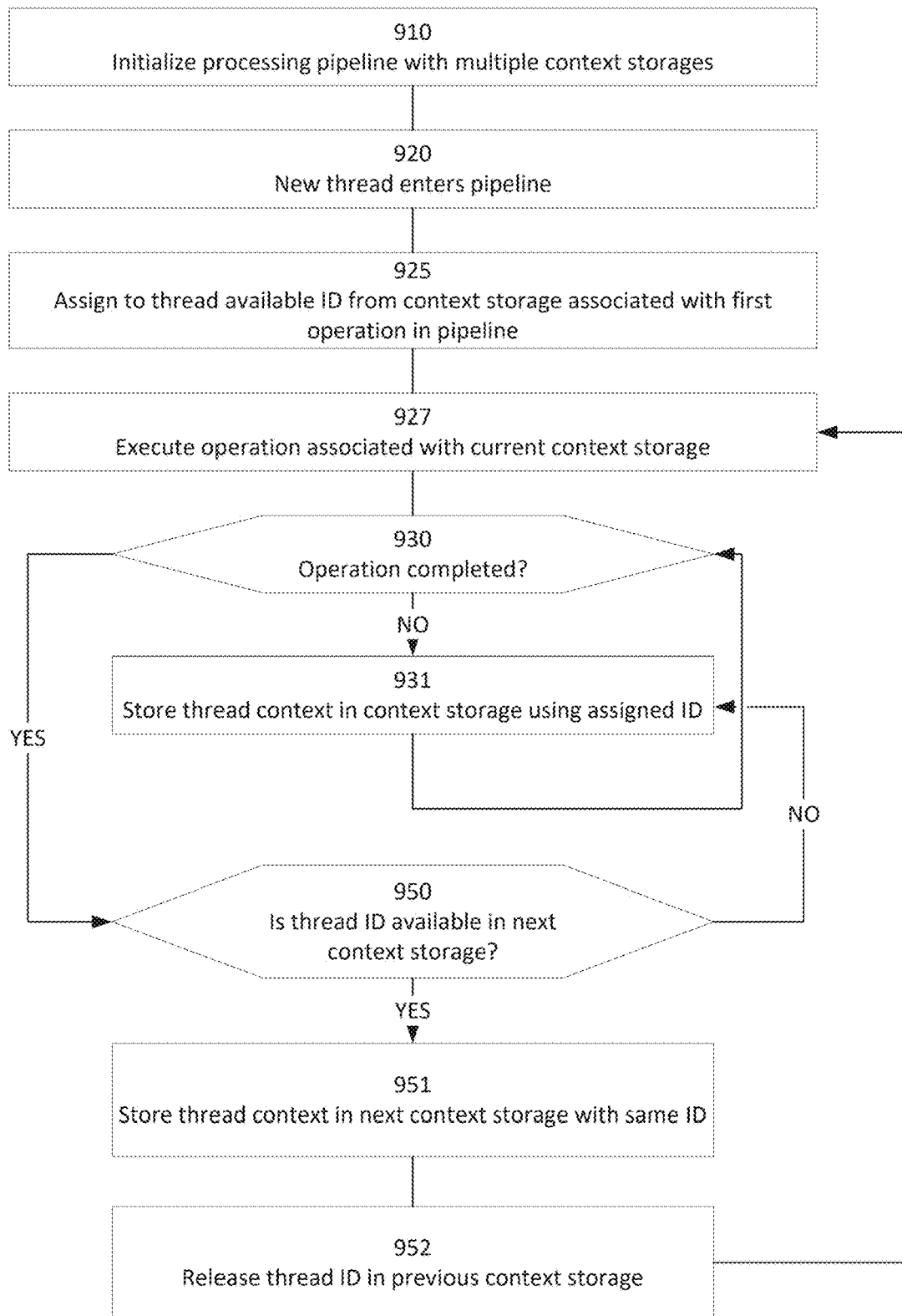
FIG. 9 is a flowchart of an additional other optional flow of operations, according to some embodiments.

While FIGS. 6, 7 and 8 illustrate specific sequential operations in the thread management process, FIG. 9 provides a broader view of a method for reusing thread identification values when executing a plurality of concurrent threads according to some embodiments described herewithin.

Reference is now made also to FIG. 9, showing a flowchart of an additional other optional flow of operations 900, according to some embodiments.

In such embodiments, in 910 processing pipeline 110 is initialized in processing circuitry 410, and each of plurality of operations 110 is associated with one of plurality of context storages 420. Optionally, processing unit 401 configures processing circuitry 410 and additionally or alternatively configures plurality of context storages 420 to initialize pipeline 110 and additionally or alternatively one or more associations between the plurality of context storages 420 and the plurality of operations 110.

In 920 a new thread optionally enters the pipeline, for example thread 140D. In 925, processing circuitry 410 optionally assigns to thread 140D an available ID from context storage 420A which is associated with a first operation of pipeline 110, i.e., operation 110A, for example ID3. In 927, processing circuitry 410 executes operation 110A for thread 140D.

In 930, processing circuitry 410 optionally determines whether operation 110A has completed for thread 140D. If not, in 931, while waiting for thread 140D to complete execution of operation 110A, processing circuitry 410 stores thread 140D's context in context storage 420A, identified in context storage 420A by ID3.

Upon completion of operation 110A for thread 140C, in 950 processing circuitry 410 optionally tests in 950 whether ID3 is available in a next context storage, for example context storage 420B. If ID3 is not available, optionally due to another thread using ID3 in the target context storage, for example thread 140C, optionally the thread context of thread 140D remains in context storage 420A, or is added to context storage 420A if was not stored there before.

When ID3 becomes available in context storage 420B, in 951 processing circuitry 410 optionally stores the thread context of thread 140D in context storage 420B while maintaining the same ID such that thread context of thread 140D is identified in context storage 420B by ID3, and in 952 processing circuitry 410 optionally releases ID3 in the context storage 420A, making ID3 available for other threads. It should be noted that steps 951 and 952 may be executed in any order, that is processing circuitry 410 may release ID3 before storing the thread context of thread 140D in context storage 420B.

Optionally, processing circuitry 410 repeats steps 927, 930, 931, 950, 951 and 952 for every operation of plurality of operations 110 executed by thread 140D.

When yet another thread enters the pipeline in another execution of 920, for example thread 140B, in executing 925 for thread 140B processing circuitry 410 optionally assigns thread 140B ID3 for operation 110A associated with context storage 420A, which is still associated with thread 140D and thread 140C in other context storages.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processing circuitries will be developed and the scope of the term "processing circuitry" is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for executing a plurality of concurrent threads, comprising:
   a plurality of context storages, each configured to store a plurality of thread contexts, each thread context for one of a plurality of concurrent threads, each concurrent thread comprising a plurality of operations, each of the plurality of context storages associated with at least one operation of the plurality of operations; and
   at least one processing circuitry configured to:
      while a first thread and a second thread of the plurality of concurrent threads are executed simultaneously by the at least one processing circuitry:
         store a first thread context of the first thread in a first context storage of the plurality of context storages, the first thread context identified in the first context storage by an identification value;
         store a second thread context of the second thread in a second context storage of the plurality of context storages, the second thread context identified in the second context storage by the identification value; and
         upon completing execution of at least one first operation of the first thread, the at least one first operation associated with the first context storage, when an outcome of applying an availability test to the identification value indicates that the identification value is available in the second context storage, store the first thread context in the second context storage, the first thread context identified in the second context storage by the identification value.

2. The system of claim 1, wherein after storing the second thread context in the second context storage and before completing execution of at least one second operation of the second thread, where the at least one second operation is associated with the second context storage, the outcome of applying the availability test to the identification value indicates that the identification value is not available in the second context storage; and
   wherein the at least one processing circuitry is further configured to:
      while the outcome of applying the availability test to the identification value indicates that the identification value is not available in the second context storage, continue to store the first thread context in the first context storage.

3. The system of claim 1, wherein the at least one processing circuitry is further configured to remove the first thread context from the first context storage.

4. The system of claim 1, wherein the at least one processing circuitry is further configured to, after storing the first thread context in the second context storage:
- cease to identify the first thread context in the first context storage by the identification value; and
- when applying another availability test to the identification value, compute another outcome that indicates that the identification value is available in the first context storage.

5. The system of claim 1, wherein the first thread context comprises a plurality of context values; and
- wherein storing the first thread context in the second context storage comprises modifying at least one of the plurality of context values.

6. The system of claim 1, wherein the first thread context comprises a plurality of context values; and
- wherein execution of at least one first operation of the first thread comprises modifying at least one other of the plurality of context values stored in the first context storage.

7. The system of claim 1, wherein the plurality of context storages comprises a sequence of context storages comprising the first context storage and an exit context storage;
- wherein the first context storage has no preceding context storage in the sequence of context storages;
- wherein the exit context storage has no succeeding context storage in the sequence of context storages; and
- wherein the at least one processing circuitry is further configured to:
  - before storing the first thread context in the first context storage, store an association between the identification value and the first thread; and
  - after completing execution of the respective at least one operation of the first thread associated with the exit context storage, remove the association between the identification value and the first thread.

8. The system of claim 7, wherein the at least one processing circuitry is further configured to:
- when a third thread of the plurality of concurrent threads is executed by the at least one processing circuitry simultaneously to executing the first thread and the second thread, store the third thread context in the first context storage where:
  - when another outcome of applying another availability test to the identification value indicates that the identification value is available in the first context storage, the third thread context is identified in the first context storage by the identification value; and
  - when the other outcome of applying the other availability test to the identification value indicates that the identification value is not available in the first context storage, the third thread context is identified in the first context storage by another identification value.

9. The system of claim 7, wherein the at least one processing circuitry is further configured to:
- after completing execution of the respective at least one operation of the first thread associated with the exit context storage:
  - store a new association between a new identification value and the first thread; and
  - store a new first thread context of the first thread in the first context storage, the new first thread context identified in the first context storage by the new identification value.

10. The system of claim 9, wherein the new first thread context comprises at least some context values from the first thread context.

11. The system of claim 1, wherein each concurrent thread of the plurality of concurrent threads implements a common dataflow graph, where the common dataflow graph comprises the plurality of operations.

12. The system of claim 1, wherein the at least one processing circuitry comprises at least one reconfigurable processing grid;
- wherein the at least one reconfigurable processing grid comprises a plurality of logical elements;
- wherein the at least one reconfigurable processing grid comprises the plurality of context storages;
- wherein the at least one hardware processor is configured to:
  - configure the at least one processing grid to execute at least one step that the at least one processing circuitry is configured to perform; and
  - configure at least some of the plurality of logical elements to implement the respective at least one operation associated with the first context storage.

13. The system of claim 1, wherein each of the plurality of context storages comprises a plurality of context entries, each for storing a plurality of runtime context values of one of the plurality of thread contexts.

14. The system of claim 1, wherein the at least one processing circuitry comprises testing circuitry for applying the availability test to the identification value.

15. The system of claim 14, wherein the at least one processing circuitry is further configured to:
- after completing execution of at least one second operation of the second thread:
- remove the second thread context from the second context storage; and
- provide the testing circuitry with at least one token value indicating that the identification value is available in the second context storage.

16. The system of claim 1, wherein the at least one operation comprises at least one of: a memory access operation, a mathematical operation, executing another computation-graph, an access to a co-processor, and an access to a peripheral device connected to the at least one processing circuitry.

17. The system of claim 1, wherein the at least one processing circuitry is further configured to:
- before storing the first thread context in the first context storage, store in the first context storage a fourth thread context of a fourth thread of the plurality of concurrent threads, the fourth thread context identified in the first context storage by yet another identification value;
- complete execution of the respective at least one operation associated with the first context storage for the fourth thread before completing execution of the at least one first operation; and
- store the first thread context in the second context storage while an outcome of applying the availability test to the yet another identification value indicates that the yet another identification value is not available in the second context storage.

18. The system of claim 1, wherein the first context storage has a capacity to store an identified amount of thread contexts; and
- wherein a total number of concurrent threads in the plurality of concurrent threads executed simultaneously by the at least one processing circuitry exceeds the identified amount of thread contexts.

19. A method for executing a plurality of concurrent threads, comprising:
while a first thread and a second thread of a plurality of concurrent threads are executed simultaneously by at least one processing circuitry:
storing, by the at least one processing circuitry, a first thread context of the first thread in a first context storage of a plurality of context storages, the first thread context identified in the first context storage by an identification value, where each of the plurality of context storages is configured to store a plurality of thread contexts, each thread context for one of the plurality of concurrent threads, each concurrent thread comprising a plurality of operations, each of the plurality of context storages associated with at least one operation of the plurality of operations;
storing, by the at least one processing circuitry, a second thread context of the second thread in a second context storage of the plurality of context storages, the second thread context identified in the second context storage by the identification value; and
upon completing execution of at least one first operation of the first thread, the at least one first operation associated with the first context storage, when an outcome of applying a credit test to the identification value indicates that the identification value is available in the second context storage, storing, by the at least one processing circuitry, the first thread context in the second context storage, the first thread context identified in the second context storage by the identification value.

20. A software program product for executing a plurality of concurrent threads, comprising:
a non-transitory computer readable storage medium;
program instructions for:
while a first thread and a second thread of a plurality of concurrent threads are executed simultaneously by at least one processing circuitry:
storing, by the at least one processing circuitry, a first thread context of the first thread in a first context storage of a plurality of context storages, the first thread context identified in the first context storage by an identification value, where each of the plurality of context storages is configured to store a plurality of thread contexts, each thread context for one of the plurality of concurrent threads, each concurrent thread comprising a plurality of operations, each of the plurality of context storages associated with at least one operation of the plurality of operations;
storing, by the at least one processing circuitry, a second thread context of the second thread in a second context storage of the plurality of context storages, the second thread context identified in the second context storage by the identification value; and
upon completing execution of at least one first operation of the first thread, the at least one first operation associated with the first context storage, when an outcome of applying a credit test to the identification value indicates that the identification value is available in the second context storage, storing, by the at least one processing circuitry, the first thread context in the second context storage, the first thread context identified in the second context storage by the identification value;
wherein the program instructions are executed by at least one computerized processor from the non-transitory computer readable storage medium.

\* \* \* \* \*